United States Patent
Sasaki et al.

(10) Patent No.: US 9,542,960 B2
(45) Date of Patent: Jan. 10, 2017

(54) THERMALLY-ASSISTED MAGNETIC RECORDING HEAD INCLUDING A MAIN POLE, A PLASMON GENERATOR AND TWO SIDE SHIELDS

(71) Applicants: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hideo Mamiya, Milpitas, CA (US); Kenichi Takano, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hideo Mamiya, Milpitas, CA (US); Kenichi Takano, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/720,319

(22) Filed: May 22, 2015

(65) Prior Publication Data
US 2016/0343391 A1    Nov. 24, 2016

(51) Int. Cl.
| | | |
|---|---|---|
| *G11B 11/00* | (2006.01) | |
| *G11B 5/31* | (2006.01) | |
| *G11B 5/48* | (2006.01) | |
| *G11B 5/00* | (2006.01) | |
| *G11B 11/105* | (2006.01) | |
| *G11B 5/60* | (2006.01) | |

(52) U.S. Cl.
CPC ............ *G11B 5/315* (2013.01); *G11B 5/3169* (2013.01); *G11B 5/4866* (2013.01); *G11B 5/314* (2013.01); *G11B 5/6088* (2013.01); *G11B 11/10534* (2013.01); *G11B 11/10536* (2013.01); *G11B 11/10543* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,068,453 B2 | 6/2006 | Terris et al. | |
| 8,400,884 B1 | 3/2013 | Araki et al. | |
| (Continued) | | | |

OTHER PUBLICATIONS

U.S. Appl. No. 14/825,020, filed Aug. 12, 2015 in the name of Sasaki et al.

(Continued)

*Primary Examiner* — Tan X Dinh
(74) *Attorney, Agent, or Firm* — Oliff PLC

(57) ABSTRACT

A thermally-assisted magnetic recording head includes a main pole, a plasmon generator, and first and second side shields. The main pole has a front end face located in the medium facing surface. The plasmon generator has a near-field light generating surface located in the medium facing surface. The front end face of the main pole includes a first end face portion, and a second end face portion greater in width than the first end face portion. The first and second side shields have first and second side shield end faces located on opposite sides of at least part of the near-field light generating surface and at least part of the first end face portion in the track width direction.

13 Claims, 29 Drawing Sheets

(56) References Cited

U.S. PATENT DOCUMENTS

| | | | | |
|---|---|---|---|---|
| 8,456,968 B1* | 6/2013 | Sasaki | G11B 5/3136 | 369/13.13 |
| 8,482,879 B1* | 7/2013 | Sasaki | G11B 5/17 | 360/123.03 |
| 8,493,821 B1* | 7/2013 | Sasaki | G11B 5/1278 | 369/13.13 |
| 8,614,932 B1* | 12/2013 | Sasaki | G11B 5/314 | 369/13.17 |
| 8,705,327 B2 | 4/2014 | Matsumoto | | |
| 8,760,809 B1 | 6/2014 | Sasaki et al. | | |
| 8,792,207 B1* | 7/2014 | Sasaki | G11B 5/1278 | 360/123.06 |
| 9,218,827 B1* | 12/2015 | Sasaki | G11B 5/17 | 369/13.33 |
| 9,218,835 B1* | 12/2015 | Sasaki | G11B 5/314 | 369/13.33 |
| 2011/0170381 A1 | 7/2011 | Matsumoto | | |
| 2012/0257304 A1* | 10/2012 | Sasaki | G11B 5/1278 | 369/13.33 |
| 2014/0247706 A1 | 9/2014 | Sasaki et al. | | |
| 2014/0269237 A1 | 9/2014 | Sasaki et al. | | |
| 2015/0071044 A1* | 3/2015 | Sasaki | G11B 5/6088 | 369/13.17 |
| 2015/0124575 A1 | 5/2015 | Sasaki et al. | | |
| 2015/0255096 A1* | 9/2015 | Sasaki | G11B 5/4866 | 369/13.33 |
| 2015/0262593 A1* | 9/2015 | Sasaki | G11B 5/314 | 369/13.17 |
| 2015/0332717 A1* | 11/2015 | Hara | G11B 5/6082 | 369/13.33 |

OTHER PUBLICATIONS

Jul. 18, 2016 Office Action Issued in U.S. Appl. No. 15/051,321.
Aug. 10, 2016 Office Action issued in U.S. Appl. No. 14/825,020.
U.S. Appl. No. 15/051,321, filed Feb. 23, 2016 in the name of Sasaki, et al.

* cited by examiner

THERMALLY-ASSISTED MAGNETIC RECORDING HEAD INCLUDING A MAIN POLE, A PLASMON GENERATOR AND TWO SIDE SHIELDS

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that occurs on the surface of the core based on the light propagating through the core, and to cause near-field light to be generated from the end face of the plasmon generator based on the excited surface plasmons.

A thermally-assisted magnetic recording head including a plasmon generator causes a spot of near-field light to be formed on a recording medium by the plasmon generator. The size of the spot of near-field light will hereinafter be referred to as light spot size. It has conventionally been considered that a smaller light spot size is effective for achieving higher recording density.

On the recording medium, the spot of near-field light generates a temperature distribution such that the temperature peaks at the center of the spot, and decreases with increasing distance from the center. Magnetic recording is typically performed on a ring-shaped region on the recording medium, the region having a temperature of 400° C. to 500° C. Hereinafter, a region on the recording medium formed by a combination of the aforementioned ring-shaped region having a temperature of 400° C. to 500° C. and a region on the inner side thereof will be referred to as thermal spot. Conventionally, track width depends on the thermal spot size.

The light spot size can be reduced to the order of 50 nm by downsizing the plasmon generator or reducing the power of the laser light for use to generate near-field light. However, since the heat resulting from near-field light spreads on the recording medium by conduction, the thermal spot size becomes larger than the light spot size. It is thus difficult to sufficiently reduce track width and thereby sufficiently increase recording density with the approach of reducing the light spot size alone.

U.S. Patent Application Publication No. 2011/0170381 A1 discloses the technique to form a plasmon generator by etching a metal layer using either the main pole or a mask for use to etch the main pole. This technique suffers from the problem that if the end face of the main pole and the end face of the plasmon generator are both reduced in width in order to achieve a smaller track width, the main pole becomes unable to pass much magnetic flux, thus becoming unable to produce a write magnetic field of sufficient magnitude from the end face of the main pole.

To enhance the recording density of a magnetic recording device, perpendicular magnetic recording system is preferably used. In perpendicular magnetic recording system, a write magnetic field in a direction perpendicular to the plane of the recording medium is produced from the end face of the main pole. When employing perpendicular magnetic recording system, it is desirable, in order to increase the track density, that the distribution of strength of the write magnetic field in the track width direction be sharpened.

U.S. Pat. No. 7,068,453 B2 discloses a thermally-assisted magnetic recording head including a write pole, a magnetic shield, and an electrically resistive heater. The write pole has a pole tip located in the medium facing surface. In this head, the electrically resistive heater has a width greater than one track width. The magnetic shield includes two side shields located on opposite sides of the pole tip in the track width direction, and a trailing shield located on the trailing side of the pole tip. The pole tip is surrounded by the electrically resistive heater, the two side shields and the trailing shield.

The track width of the head disclosed in U.S. Pat. No. 7,068,453 B2 is determined by the width of the pole tip. In this head, if the width of the pole tip is reduced in order to achieve a smaller track width, the write pole becomes unable to pass much magnetic flux, and consequently becomes unable to produce a write magnetic field of sufficient magnitude from the pole tip.

OBJECT AND SUMMARY OF THE INVENTION

It is an object of the present invention to provide a thermally-assisted magnetic recording head with a reduced track width and a main pole capable of producing a write magnetic field of sufficient magnitude, and to provide a method of manufacturing such a thermally-assisted magnetic recording head.

A thermally-assisted magnetic recording head of the present invention includes: a medium facing surface configured to face a recording medium; a coil for producing a magnetic field corresponding to data to be written on the recording medium; a main pole; a waveguide; a plasmon generator; and a first side shield and a second side shield each formed of a magnetic material. The main pole has a front end face located in the medium facing surface. The waveguide includes a core and a cladding, the core allowing light to propagate therethrough, the cladding being provided around the core. The plasmon generator has a near-field light generating surface located in the medium facing surface.

The main pole is configured to pass a magnetic flux corresponding to the magnetic field produced by the coil, and to produce from the front end face a write magnetic field for use to write data on the recording medium. The plasmon generator is configured to excite a surface plasmon on the plasmon generator based on the light propagating through the core, and to generate near-field light from the near-field light generating surface based on the surface plasmon. The front end face of the main pole includes a first end face portion, and a second end face portion contiguous with the first end face portion. The second end face portion is greater than the first end face portion in width in the track width direction. The near-field light generating surface, the first end face portion and the second end face portion are arranged in this order along the direction of travel of the recording medium. The main pole includes a first portion and a second portion, the first portion including the first end face portion, the second portion including the second end face portion.

The first side shield has a first side shield end face located in the medium facing surface. The second side shield has a second side shield end face located in the medium facing surface. The first side shield end face and the second side shield end face are located on opposite sides of at least part of the near-field light generating surface and at least part of the first end face portion in the track width direction such that the at least part of the near-field light generating surface and the at least part of the first end face portion are interposed between the first and second side shield end faces.

The thermally-assisted magnetic recording head of the present invention may further include a gap film formed of a nonmagnetic material. The gap film is a single continuous film, and at least part of the gap film is interposed between the main pole and the plasmon generator, between the main pole and the first side shield, and between the main pole and the second side shield.

The gap film may be formed of one of nonmagnetic metal, SiC, and AlN.

In the thermally-assisted magnetic recording head of the present invention, the first end face portion may have a first edge closest to the near-field light generating surface, and a second edge located at the boundary between the first end face portion and the second end face portion. The second edge may be longer than the first edge.

In the thermally-assisted magnetic recording head of the present invention, the core may have an evanescent light generating surface for generating evanescent light based on the light propagating through the core, and the plasmon generator may have a plasmon exciting section located at a predetermined distance from the evanescent light generating surface and facing the evanescent light generating surface. In this case, in the plasmon generator, a surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

In the thermally-assisted magnetic recording head of the present invention, the front end face of the main pole may be located on the front side in the direction of travel of the recording medium relative to the near-field light generating surface.

The thermally-assisted magnetic recording head of the present invention may further include a return path section formed of a magnetic material, the return path section connecting the main pole to the first and second side shields and passing a magnetic flux corresponding to the magnetic field produced by the coil.

A manufacturing method for the thermally-assisted magnetic recording head of the present invention includes the steps of: forming the waveguide; forming the plasmon generator; forming the first and second side shields after the plasmon generator is formed; forming the main pole after the first and second side shields are formed; and forming the coil.

The thermally-assisted magnetic recording head manufactured by the manufacturing method of the present invention may further include a gap film formed of a nonmagnetic material. The gap film is a single continuous film, and at least part of the gap film is interposed between the main pole and the plasmon generator, between the main pole and the first side shield, and between the main pole and the second side shield.

Where the thermally-assisted magnetic recording head includes the gap film, the step of forming the plasmon generator may include the steps of: forming an initial plasmon generator; forming an etching mask for use to pattern the initial plasmon generator; and etching the initial plasmon generator by using the etching mask so that the initial plasmon generator becomes the plasmon generator.

Further, the step of forming the first and second side shields may include the step of forming a magnetic layer, and the processing step of processing the magnetic layer into the first and second side shields and removing at least part of the etching mask. The processing step results in the formation of a structure having a recess, the structure including the plasmon generator and the first and second side shields.

The manufacturing method of the present invention may further include the step of forming the gap film on the structure after the processing step such that the gap film forms a receiving section corresponding to the recess. In such a case, the main pole is formed on the gap film such that the first portion is received in the receiving section after the step of forming the gap film.

The receiving section may have a bottom closest to the plasmon generator, and an opening farthest from the plasmon generator. In a cross section corresponding to the medium facing surface, the bottom may be smaller than the opening in width in the track width direction.

In the step of etching the initial plasmon generator, the initial plasmon generator may be etched to make the plasmon generator smaller in width in the track width direction than the etching mask in the cross section corresponding to the medium facing surface.

The processing step may include the step of polishing the magnetic layer until the etching mask is exposed, and the step of removing the etching mask after the step of polishing the magnetic layer.

Alternatively, the processing step may include the step of polishing the magnetic layer until the etching mask is exposed, and the step of etching part of the magnetic layer and at least part of the etching mask after the step of polishing the magnetic layer.

In the present invention, the front end face of the main pole includes the first end face portion and the second end face portion, the second end face portion being greater than the first end face portion in width in the track width direction. By virtue of this configuration, the present invention makes it possible for the main pole to pass a large amount of magnetic flux.

Further, in the present invention, the first side shield end face and the second side shield end face are located on opposite sides of at least part of the near-field light generating surface and at least part of the first end face portion in the track width direction such that the at least part of the near-field light generating surface and the at least part of the first end face portion are interposed between the first and second side shield end faces. By virtue of this configuration, the present invention makes it possible to sharpen the distribution of strength of the write magnetic field in the track width direction in a region on the recording medium where to write data.

Consequently, according to the present invention, it is possible to achieve a small track width and to produce a write magnetic field of sufficient magnitude from the main pole.

Other and further objects, features and advantages of the present invention will appear more fully from the following description.

DETAILED DESCRIPTION OF THE PREFERRED EMBODIMENTS

First Embodiment

Figure 1:
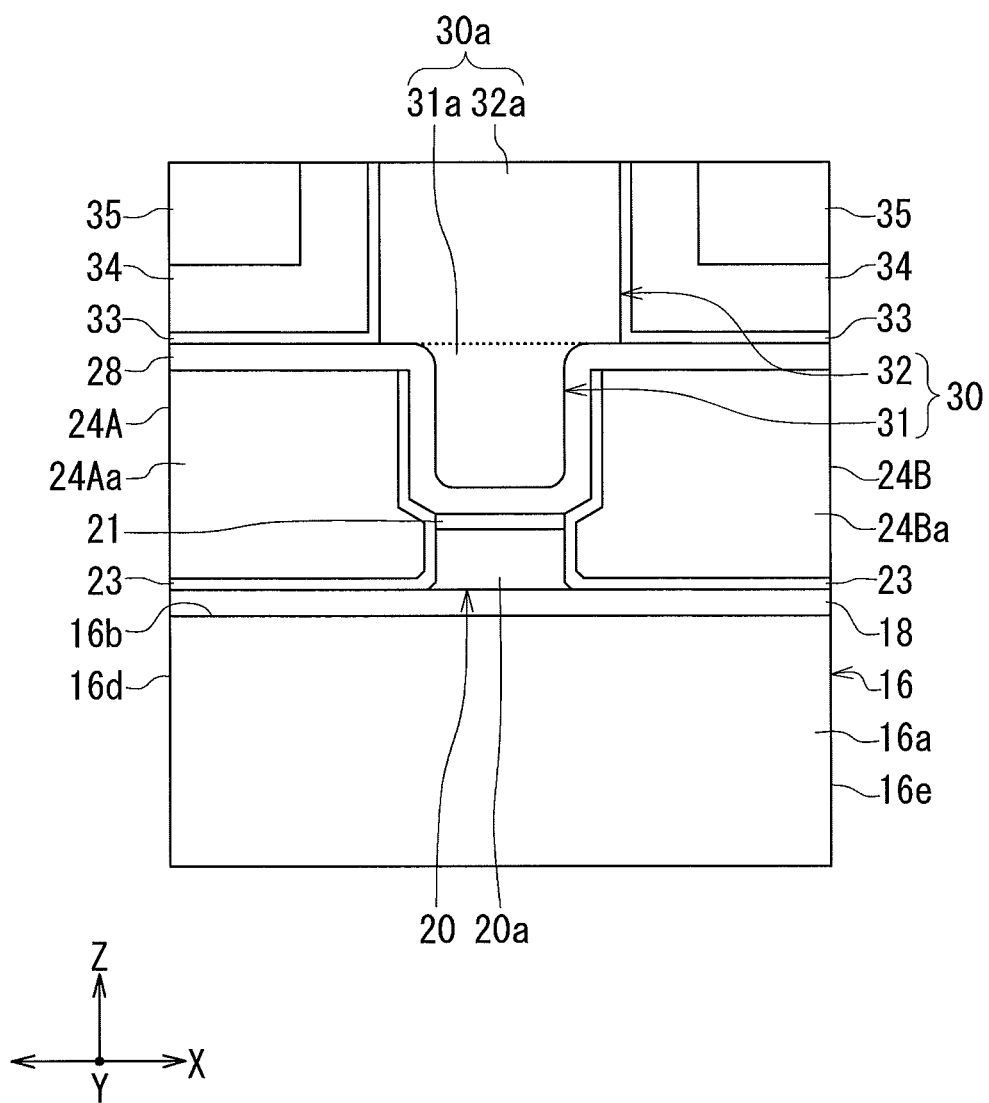
FIG. 1 is a front view showing the main part of a thermally-assisted magnetic recording head according to a first embodiment of the invention.
Figure 2:
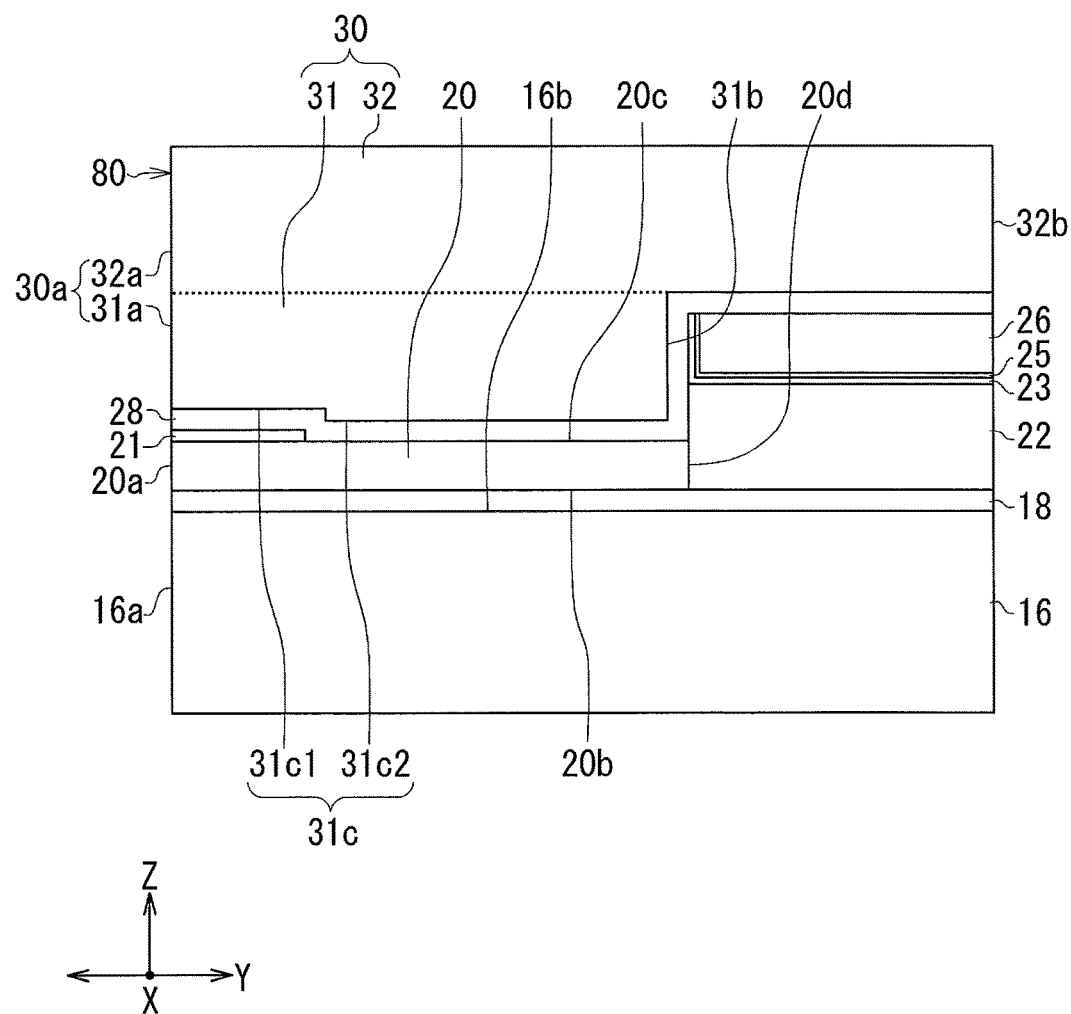
FIG. 2 is a cross-sectional view showing the main part of the thermally-assisted magnetic recording head according to the first embodiment of the invention.
Figure 3:
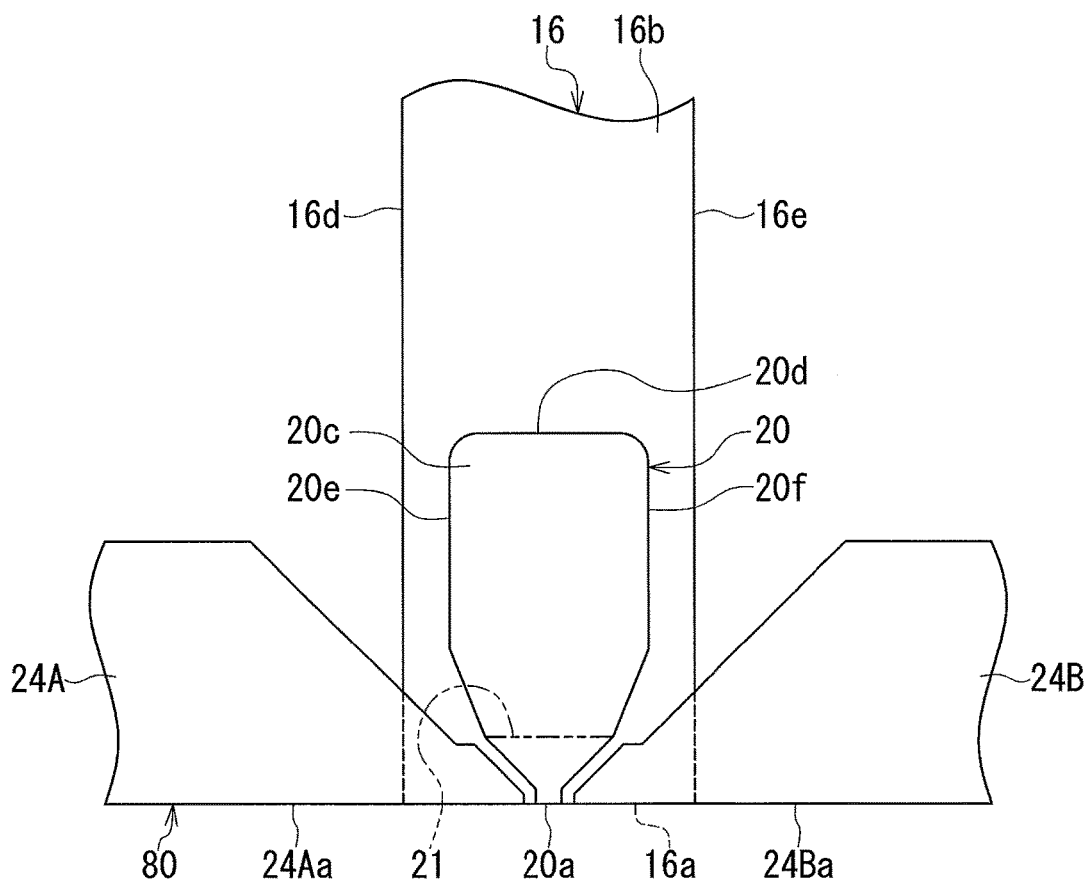
FIG. 3 is a plan view showing a core, a plasmon generator, a first side shield and a second side shield of the first embodiment of the invention.
Figure 4:
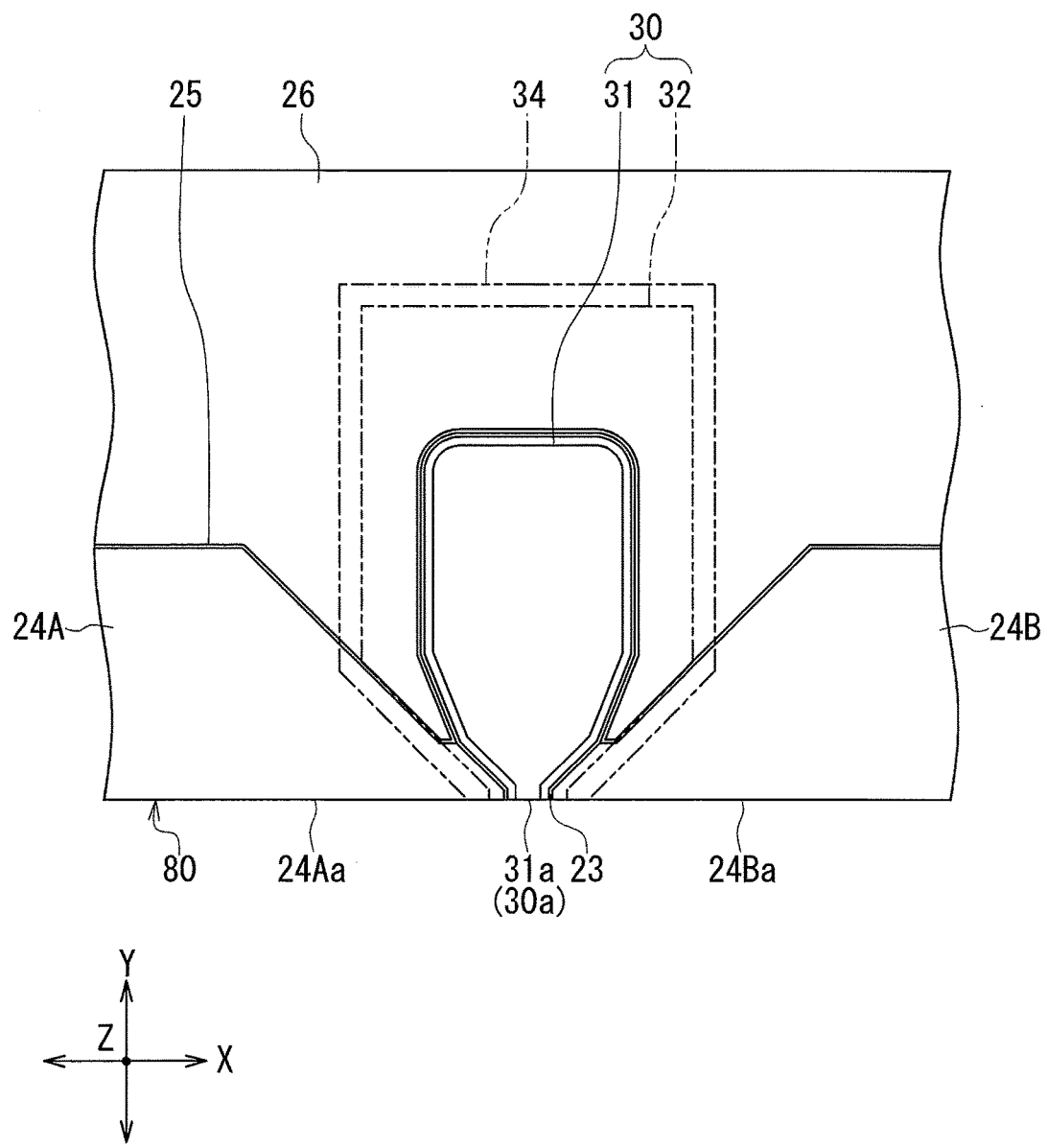
FIG. 4 is a plan view showing a main pole, the first side shield, the second side shield, a first heat sink and a second heat sink of the first embodiment of the invention.
Figure 5:
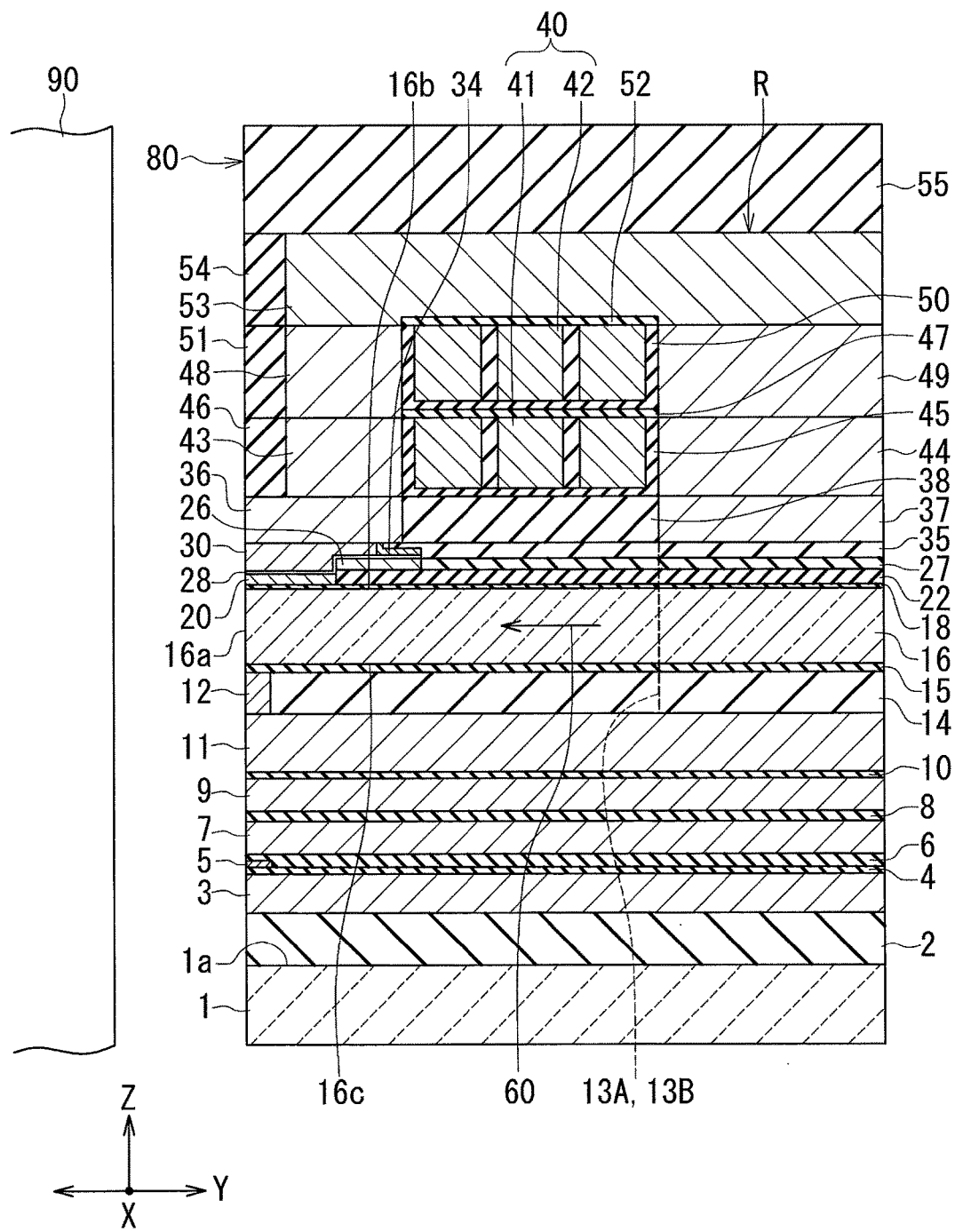
FIG. 5 is a cross-sectional view showing the configuration of the thermally-assisted magnetic recording head according to the first embodiment of the invention.
Figure 6:
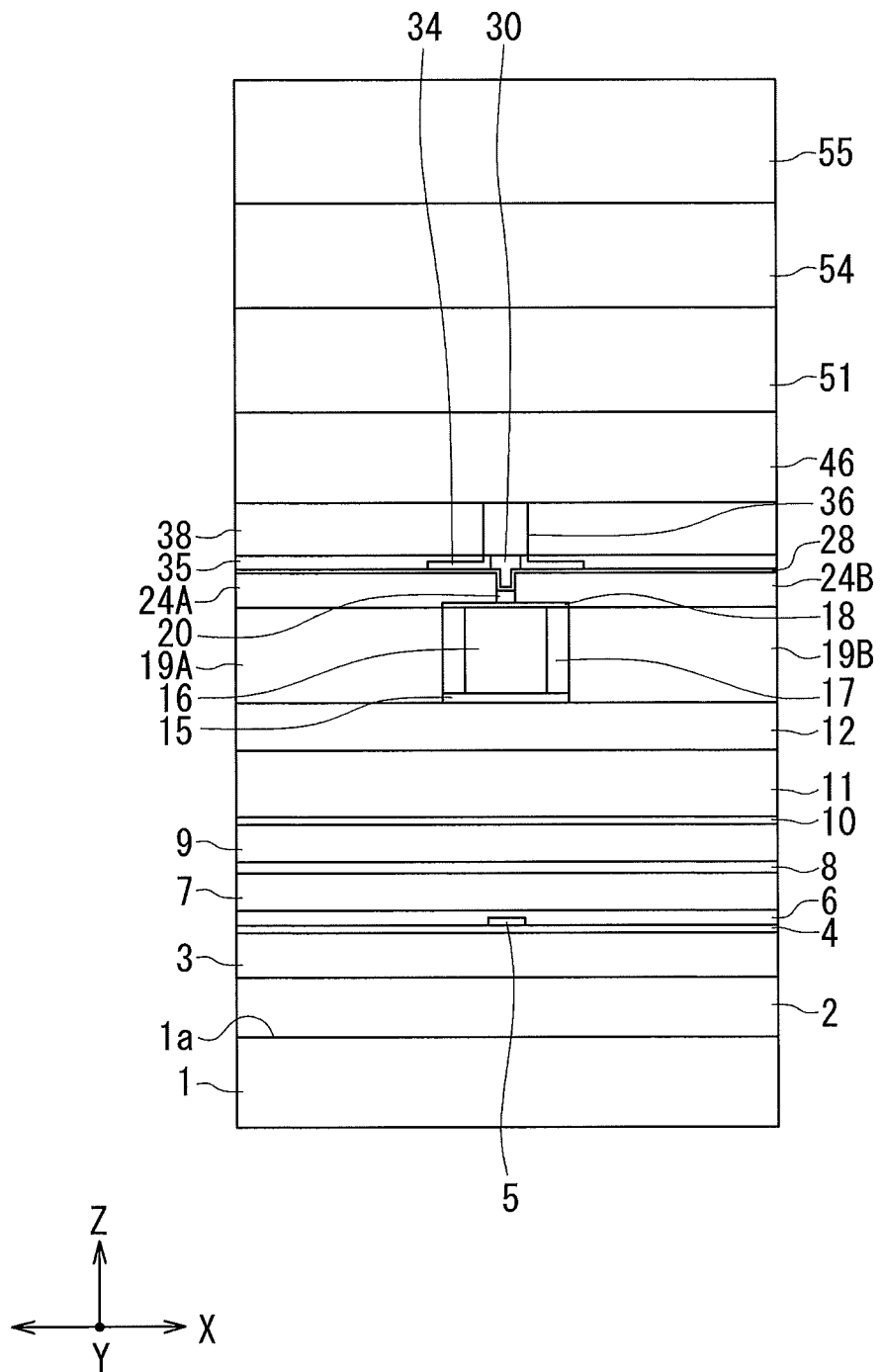
FIG. 6 is a front view showing the medium facing surface of the thermally-assisted magnetic recording head according to the first embodiment of the invention.
Figure 7:
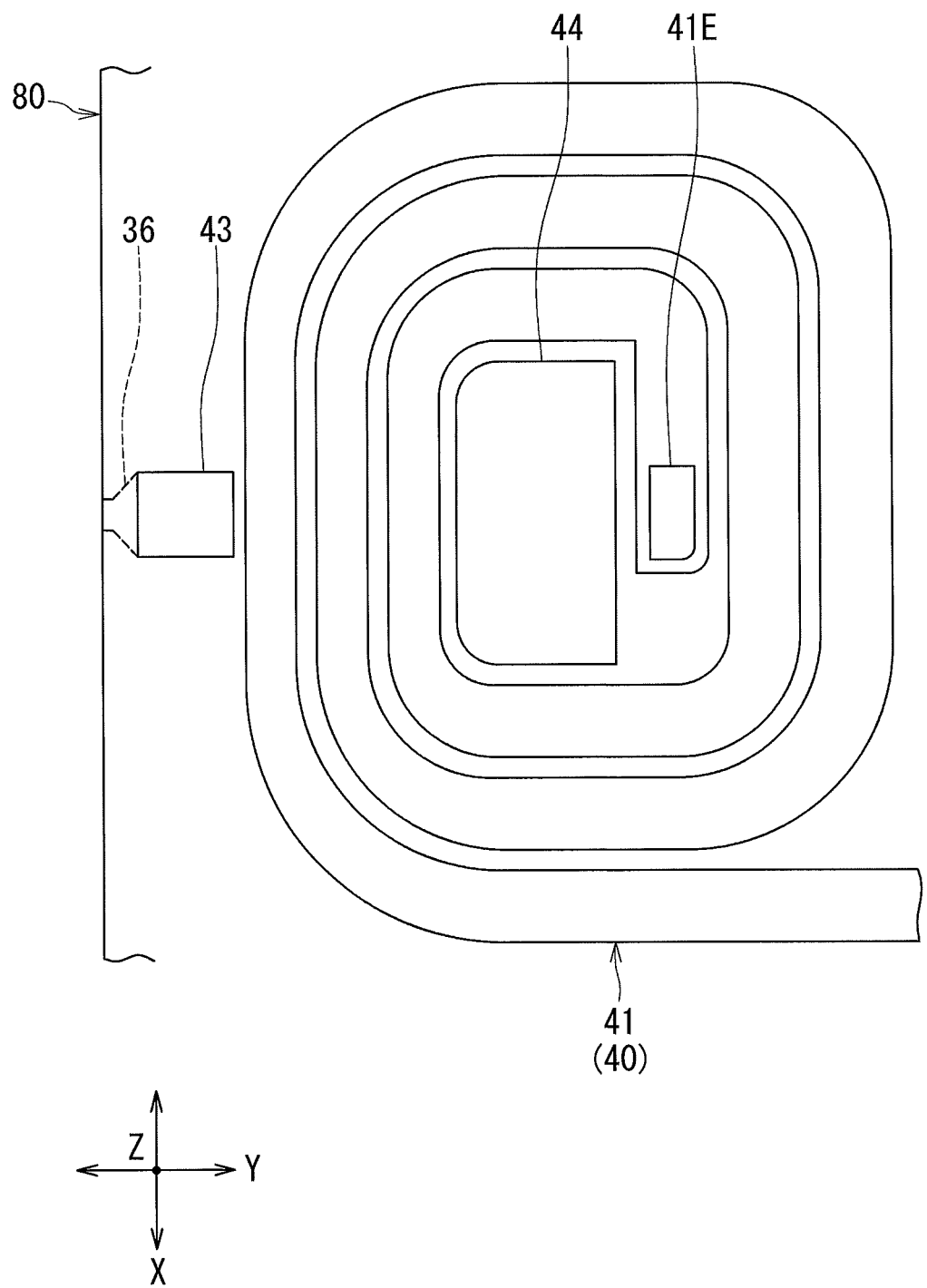
FIG. 7 is a plan view showing a first layer of a coil of the first embodiment of the invention.
Figure 8:
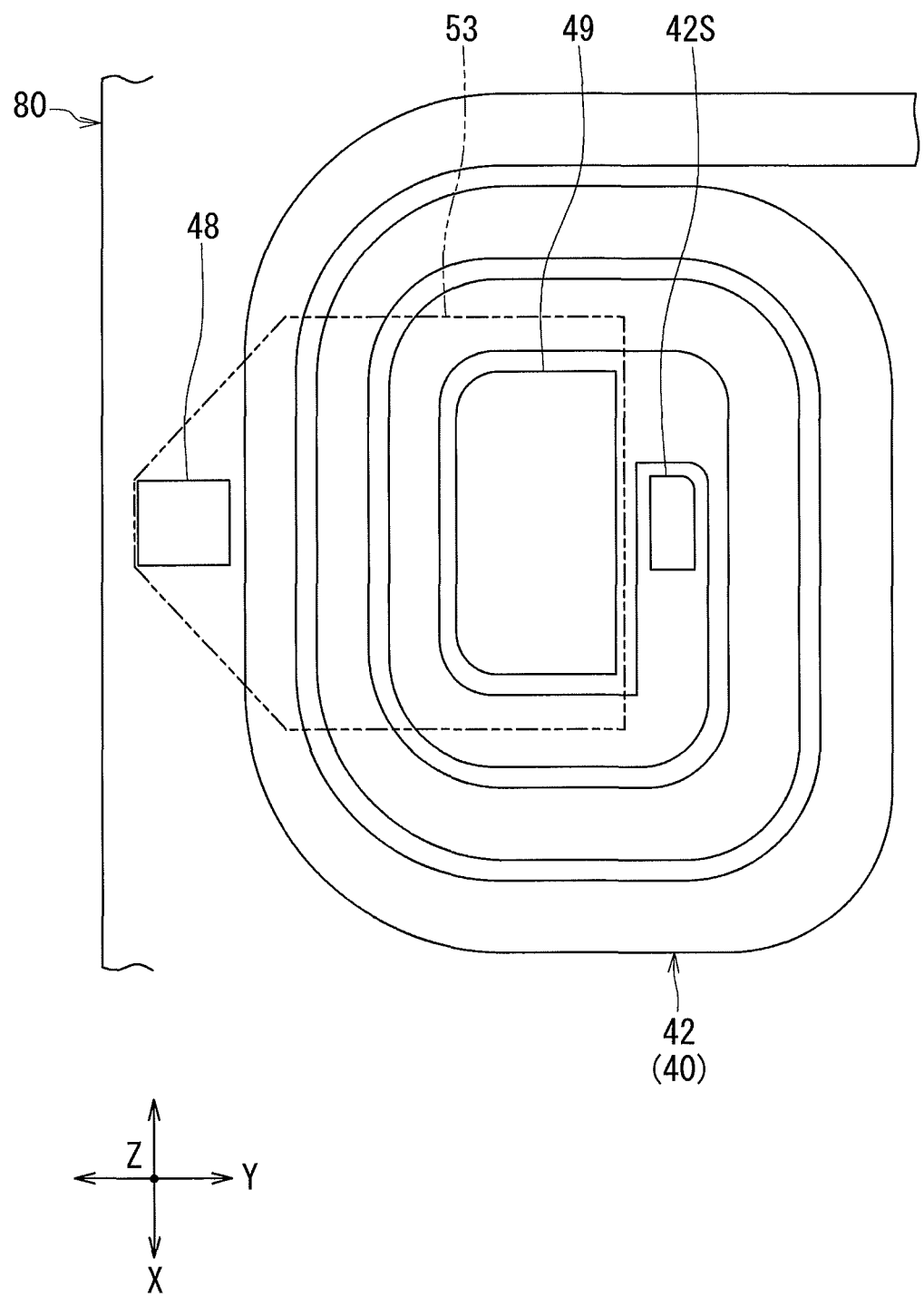
FIG. 8 is a plan view showing a second layer of the coil of the first embodiment of the invention.

Preferred embodiments of the present invention will now be described in detail with reference to the drawings. First, reference is made to FIG. 1 to FIG. 8 to describe the configuration of a thermally-assisted magnetic recording head according to a first embodiment of the invention. FIG. 1 is a front view showing the main part of the thermally-assisted magnetic recording head. FIG. 2 is a cross-sectional view showing the main part of the thermally-assisted magnetic recording head. FIG. 3 is a plan view showing a core, a plasmon generator, a first side shield and a second side shield. FIG. 4 is a plan view showing a main pole, the first side shield, the second side shield, a first heat sink and a second heat sink. FIG. 5 is a cross-sectional view showing the configuration of the thermally-assisted magnetic recording head. FIG. 6 is a front view showing the medium facing surface of the thermally-assisted magnetic recording head. FIG. 7 is a plan view showing a first layer of a coil of the present embodiment. FIG. 8 is a plan view showing a second layer of the coil of the present embodiment.

The thermally-assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 5, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 40 and a main pole 30. The coil 40 produces a magnetic field corresponding to data to be written on the recording medium 90. As shown in FIGS. 1, 2 and 4, the main pole 30 has a front end face 30a located in the medium facing surface 80. The main pole 30 is configured to pass a magnetic flux corresponding to the magnetic field produced by the coil 40, and to produce from the front end face 30a a write magnetic field for use to write data on the recording medium 90 by means of a perpendicular magnetic recording system. The coil 40 is formed of a conductive material such as copper.

The write head unit further includes a first side shield 24A and a second side shield 24B each formed of a magnetic material, and a return path section R formed of a magnetic material. The first and second side shields 24A and 24B are each formed of a magnetic metal material, in particular. As shown in FIGS. 1, 3 and 4, the first side shield 24A has a first side shield end face 24Aa located in the medium facing surface 80. The second side shield 24B has a second side shield end face 24Ba located in the medium facing surface 80. The return path section R connects the main pole 30 to the first and second side shields 24A and 24B, and passes a magnetic flux corresponding to the magnetic field produced by the coil 40.

The return path section R includes a return pole layer 11, coupling layers 12, 36, 37, 43, 44, 48 and 49, two first coupling sections 13A and 13B, two second coupling sections 19A and 19B, and a yoke layer 53. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The coupling layer 12 is disposed on a first portion of the top surface of the return pole layer 11, the first portion being near the medium facing surface 80. The two first coupling sections 13A and 13B are disposed on two second portions of the top surface of the return pole layer 11, the two second portions being located away from the medium facing surface 80. Each of the first coupling sections 13A and 13B includes a first layer lying on the return pole layer 11, and a second and a third layer stacked in this order on the first layer. The first layer of the first coupling section 13A and the first layer of the first coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the first coupling sections 13A and 13B are embedded in the insulating layer 14. The insulating layer 14 is formed of alumina, for example.

The write head unit further includes a waveguide including a core 16 and a cladding, the core 16 allowing light to propagate therethrough, the cladding being provided around the core 16. As shown in FIGS. 1 to 3 and FIG. 5 in particular, the core 16 has a front end face 16a facing toward the medium facing surface 80, an evanescent light generating surface 16b which is a top surface, a bottom surface 16c, and two side surfaces 16d and 16e. The front end face 16a may be located in the medium facing surface 80 or at a distance from the medium facing surface 80. FIGS. 1 to 3, FIG. 5, and FIG. 6 show an example in which the front end face 16a is located in the medium facing surface 80.

The cladding includes cladding layers 15, 17 and 18. The cladding layer 15 lies on the coupling layer 12 and the insulating layer 14. The core 16 lies on the cladding layer 15. The cladding layer 17 lies on the cladding layer 15 and surrounds the core 16. The cladding layer 18 is disposed over the evanescent light generating surface 16b of the core 16 and the top surface of the cladding layer 17.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

As shown in FIG. 6, the two second coupling sections 19A and 19B are disposed on the coupling layer 12. The second coupling sections 19A and 19B and the second layers of the first coupling sections 13A and 13B are embedded in the cladding layers 15 and 17. The second coupling section 19A and the second coupling section 19B are located on opposite sides of the core 16 in the track width direction (the X direction) and spaced from the core 16. The second layer of the first coupling section 13A and the second layer of the first coupling section 13B are also located on opposite sides of the core 16 in the track width direction (the X direction) and spaced from the core 16, but located farther from the medium facing surface 80 than are the second coupling sections 19A and 19B.

The write head unit further includes a plasmon generator 20 lying on the cladding layer 18 in the vicinity of the medium facing surface 80. The plasmon generator 20 is configured to excite surface plasmons on the principle to be described later. The plasmon generator 20 is formed of, for example, one of Au, Ag, Al, Cu, Pd, Pt, Rh and Ir, or an alloy composed of two or more of these elements. The shape of the plasmon generator 20 will be described in detail later.

The write head unit further includes a first insulating film 21 and a second insulating film 22. As shown in FIGS. 1 to 3, the first insulating film 21 lies on a portion of the plasmon generator 20 in the vicinity of the medium facing surface 80. FIGS. 5 and 6 omit the illustration of the first insulating film 21. As shown in FIGS. 2 and 5, the second insulating film 22 lies on the cladding layer 18. The second insulating film 22 is located in a region above the evanescent light generating surface 16b, the region being one in which none of the plasmon generator 20 and the first and second side shields 24A and 24B are present. The second insulating film 22 has a thickness in the range of 100 to 200 nm, for example. The first and second insulating films 21 and 22 are formed of alumina or silicon oxide.

The first side shield 24A and the second side shield 24B are located above the core 16 at positions on opposite sides of the plasmon generator 20 in the track width direction (the X direction) and spaced from the plasmon generator 20. The write head unit further includes a nonmagnetic film 23 formed of a nonmagnetic material and separating the plasmon generator 20 from the first and second side shields 24A and 24B. As shown in FIG. 1, the nonmagnetic film 23 is interposed between the plasmon generator 20 and the first side shield 24A, between the plasmon generator 20 and the second side shield 24B, between the cladding layer 18 and the first side shield 24A, and between the cladding layer 18 and the second side shield 24B. FIGS. 5 and 6 omit the illustration of the nonmagnetic film 23. Each of the cladding layer 18 and the nonmagnetic film 23 has two openings for exposing the top surfaces of the second coupling sections 19A and 19B. The first side shield 24A lies on the second coupling section 19A and the nonmagnetic film 23. The second side shield 24B lies on the second coupling section 19B and the nonmagnetic film 23.

The nonmagnetic material used to form the nonmagnetic film 23 may be an insulating material or a nonmagnetic metal material. Alumina or silicon oxide, for example, may be selected as an insulating material for use to form the nonmagnetic film 23. One of Ru, Ti, Cr, Ta, Zr and W, for example, may be selected as a nonmagnetic metal material for use to form the nonmagnetic film 23.

The main pole 30 is located on the front side in the direction of travel of the recording medium 90 relative to the core 16. The plasmon generator 20 is located between the core 16 and the main pole 30. The write head unit further includes a gap film 28 formed of a nonmagnetic material. As shown in FIGS. 1, 2, 5 and 6, the gap film 28 is a single continuous film, and at least part of the gap film 28 is interposed between the main pole 30 and the plasmon generator 20, between the main pole 30 and the first side shield 24A, and between the main pole 30 and the second side shield 24B. FIG. 4 omits the illustration of the gap film 28. As shown in FIGS. 1 and 2, the insulating film 21 is interposed between the gap film 28 and the plasmon generator 20 in the vicinity of the medium facing surface 80. As shown in FIG. 1, the nonmagnetic film 23 is interposed between the gap film 28 and the first side shield 24A and between the gap film 28 and the second side shield 24B.

The nonmagnetic material used to form the gap film 28 may be either a conductive material such as metal or an insulating material. The gap film 28 may be formed of one of nonmagnetic metal, SiC, and AlN. Nonmagnetic metal and SiC are conductive materials. AlN is an insulating material. An example of a nonmagnetic metal material that can be used to form the gap film 28 is Ru.

The gap film 28 is preferably thicker than the nonmagnetic film 23. The nonmagnetic film 23 has a thickness in the range of 5 to 20 nm, for example. The gap film 28 has a thickness preferably in the range of 10 nm to 50 nm, and more preferably in the range of 20 to 40 nm.

The main pole 30 includes a first portion 31 and a second portion 32. Part of the first portion 31 is located between the first side shield 24A and the second side shield 24B. The second portion 32 is located on the front side in the direction of travel of the recording medium 90 (the Z direction) relative to the first portion 31. In FIGS. 1 and 2, the boundary between the first portion 31 and the second portion 32 is indicated by a dotted line. Part of the second portion 32 lies over the first and second side shields 24A and 24B with the gap film 28 interposed between the part of the second portion 32 and each of the first and second side shields 24A and 24B.

The write head unit further includes a first heat sink 26 and a nonmagnetic metal film 25. The first heat sink 26 is located in part of a region above the cladding layer 18, the region being one in which none of the first portion 31 of the main pole 30 and the first and second side shields 24A and 24B are present. The second insulating film 22 is interposed between the evanescent light generating surface 16b and the first heat sink 26. The light propagating through the core 16 is thereby prevented from being absorbed by the first heat sink 26.

As shown in FIGS. 2 and 4, the nonmagnetic metal film 25 is interposed between the first heat sink 26 and the second insulating film 22, between the first heat sink 26 and the first portion 31 of the main pole 30, between the first heat sink 26 and the first side shield 24A, and between the first heat sink 26 and the second side shield 24B. FIG. 5 omits the illustration of the nonmagnetic metal film 25. As shown in FIGS. 2 and 4, the nonmagnetic film 23 and the gap film 28 are present between the nonmagnetic metal film 25 and the first portion 31 of the main pole 30, the nonmagnetic film 23 being located closer to the nonmagnetic metal film 25 than the gap film 28. As shown in FIG. 2, the nonmagnetic film 23 is interposed between the nonmagnetic metal film 25 and the second insulating film 22. Although not illustrated, the nonmagnetic metal film 25 and the nonmagnetic film 23 are present between the first heat sink 26 and the cladding layer 18, the nonmagnetic metal film 25 being located closer to the first heat sink 26 than the nonmagnetic film 23.

The first heat sink 26 has the function of dissipating heat generated by the plasmon generator 20 outward from the main pole 30, the first side shield 24A and the second side shield 24B. The first heat sink 26 is formed of Ru, Au or Cr, for example. The nonmagnetic metal film 25 has the function of preventing the material of the first heat sink 26 from diffusing into the main pole 30, the first side shield 24A and the second side shield 24B. The nonmagnetic metal film 25 is formed of Ru, Cr, Zr, Ti or Ta, for example. Even when the nonmagnetic metal film 25 and the first heat sink 26 are formed of the same material, the nonmagnetic metal film 25 and the first heat sink 26 have different properties because they are formed by different methods.

The write head unit further includes a dielectric layer 27 formed of a dielectric material and disposed around the second insulating film 22, the first side shield 24A, the second side shield 24B and the first heat sink 26. The dielectric layer 27 is formed of the same material as the cladding layers 15, 17 and 18, for example.

The write head unit further includes a second heat sink 34 and a nonmagnetic metal film 33. The second heat sink 34 is disposed to extend along the top surfaces of the first side shield 24A, the second side shield 24B and the first heat sink 26 and the side surfaces of the second portion 32 of the main pole 30. FIG. 4 shows a portion of the second heat sink 34 disposed along the side surfaces of the second portion 32. As shown in FIG. 1, the nonmagnetic metal film 33 is interposed between the second heat sink 34 and the second portion 32, between the second heat sink 34 and the first side shield 24A, and between the second heat sink 34 and the second side shield 24B. FIGS. 5 and 6 omit the illustration of the nonmagnetic metal film 33. As shown in FIG. 1, the gap film 28 is interposed between the nonmagnetic metal film 33 and the first side shield 24A and between the nonmagnetic metal film 33 and the second side shield 24B. Although not illustrated, the nonmagnetic metal film 33 and the gap film 28 are present between the second heat sink 34 and the first heat sink 26, the nonmagnetic metal film 33 being located closer to the second heat sink 34 than the gap film 28.

The second heat sink 34 has the same function as that of the first heat sink 26. Specifically, the second heat sink 34 has the function of dissipating the heat generated by the plasmon generator 20 outward from the main pole 30, the first side shield 24A and the second side shield 24B. The second heat sink 34 is formed of the same material as the first heat sink 26, for example. The nonmagnetic metal film 33 has the function of preventing the material of the second heat sink 34 from diffusing into the main pole 30, the first side shield 24A and the second side shield 24B. The nonmagnetic metal film 33 is formed of the same material as the nonmagnetic metal film 25, for example.

The write head unit further includes a dielectric layer 35 provided around the second heat sink 34. The dielectric layer 35 is formed of the same material as the cladding layers 15, 17 and 18, for example.

The third layers of the first coupling sections 13A and 13B are embedded in the cladding layer 18 and the dielectric layers 27 and 35. The coupling layer 37 lies on the third layers of the first coupling sections 13A and 13B and the dielectric layer 35.

The coupling layer 36 lies on the main pole 30, the second heat sink 34 and the dielectric layer 35. The coupling layer 36 has an end face located in the medium facing surface 80. The coupling layer 36 may include a narrow portion and a wide portion as shown in FIG. 7, the narrow portion having the aforementioned end face of the coupling layer 36 and an end opposite thereto, the wide portion being connected to the end of the narrow portion. The wide portion is greater than the narrow portion in width in the track width direction (the X direction). The width of the narrow portion in the track width direction is substantially constant regardless of distance from the medium facing surface 80. The width of the wide portion in the track width direction is equal to that of the narrow portion at the boundary between the narrow portion and the wide portion, and gradually increases with increasing distance from the medium facing surface 80, then becoming constant.

The write head unit further includes a non-illustrated nonmagnetic metal film interposed between the second heat sink 34 and the coupling layer 36, and a dielectric layer 38 disposed around the coupling layer 36 and the coupling layer 37. The non-illustrated nonmagnetic metal film has the function of preventing the material of the second heat sink 34 from diffusing into the coupling layer 36. The non-illustrated nonmagnetic metal film is formed of the same material as the nonmagnetic metal film 25, for example. The dielectric layer 38 is formed of the same material as the cladding layers 15, 17 and 18, for example.

The coupling layer 43 lies on the coupling layer 36. The coupling layer 43 has an end face facing toward the medium facing surface 80 and located at a distance from the medium facing surface 80. The coupling layer 44 lies on the coupling layer 37.

The coil 40 includes a first layer 41 and a second layer 42. As shown in FIG. 7, the first layer 41 is wound around the coupling layer 44. The write head unit further includes an insulating film 45, an insulating layer 46 and an insulating layer 47. The insulating film 45 is interposed between the first layer 41 and each of the coupling layers 43 and 44 and the dielectric layer 38. The insulating layer 46 is disposed around the first layer 41 and the coupling layer 43 and in the space between adjacent turns of the first layer 41. The insulating layer 47 lies on the first layer 41, the insulating film 45 and the insulating layer 46. The insulating film 45 and the insulating layers 46 and 47 are formed of alumina, for example.

The coupling layer 48 lies on the coupling layer 43. The coupling layer 48 has an end face facing toward the medium facing surface 80 and located at a distance from the medium facing surface 80. The coupling layer 49 lies on the coupling layer 44.

The second layer 42 of the coil 40 lies above the first layer 41. As shown in FIG. 8, the second layer 42 is wound around the coupling layer 49. The write head unit further includes an insulating film 50, an insulating layer 51 and an insulating layer 52. The insulating film 50 is interposed between the second layer 42 and each of the coupling layers 48 and 49 and the insulating layer 47. The insulating layer 51 is disposed around the second layer 42 and the coupling layer 48 and in the space between adjacent turns of the second layer 42. The insulating layer 52 lies on the second layer 42, the insulating film 50 and the insulating layer 51. The insulating film 50 and the insulating layers 51 and 52 are formed of alumina, for example.

The yoke layer 53 lies on the coupling layers 48 and 49 and the insulating layer 52. The yoke layer 53 has an end face facing toward the medium facing surface 80 and located at a distance from the medium facing surface 80. The write head unit further includes an insulating layer 54 disposed around the yoke layer 53. The insulating layer 54 is formed of alumina, for example.

As shown in FIGS. 5 and 6, the thermally-assisted magnetic recording head further includes a protective layer 55 disposed to cover the write head unit. The protective layer 55 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 40, the main pole 30, the waveguide, the plasmon generator 20, the first and second side shields 24A and 24B, the return path section R, and the gap film 28. The waveguide includes the core 16 and the cladding. The cladding includes the cladding layers 15, 17 and 18. The return path section R includes the return pole layer 11, the coupling layers 12, 36, 37, 43, 44, 48 and 49, the two first coupling sections 13A and 13B, the two second coupling sections 19A and 19B, and the yoke layer 53.

The first and second side shields 24A and 24B capture a disturbance magnetic field applied to the thermally-assisted magnetic recording head from the outside thereof. This makes it possible to prevent the disturbance magnetic field from being intensively captured into the main pole 30 and thereby causing erroneous writing on the recording medium 90. The first and second side shields 24A and 24B also have the function of capturing a magnetic flux that is produced from the front end face 30a of the main pole 30 and spreads in directions other than the direction perpendicular to the plane of the recording medium 90, and thereby preventing the magnetic flux from reaching the recording medium 90. It is thereby possible to increase the gradient of strength of the write magnetic field. Further, the first and second side shields 24A and 24B and the return path section R have the function of allowing a magnetic flux that has been produced from the front end face 30a of the main pole 30 and has magnetized a portion of the recording medium 90 to flow back to the main pole 30.

The shape and location of the coil 40 will now be described in detail with reference to FIGS. 7 and 8. As shown in FIG. 7, the first layer 41 of the coil 40 is wound approximately three times around the coupling layer 44. The first layer 41 includes a portion extending to pass through between the coupling layer 43 and the coupling layer 44. The first layer 41 has a coil connection 41E electrically connected to the second layer 42 of the coil 40.

As shown in FIG. 8, the second layer 42 is wound approximately three times around the coupling layer 49. The second layer 42 includes a portion extending to pass through between the coupling layer 48 and the coupling layer 49. The second layer 42 has a coil connection 42S electrically connected to the coil connection 41E of the first layer 41. The coil connection 42S penetrates the insulating layer 47 and the insulating film 50 (see FIG. 5) and is electrically connected to the coil connection 41E. In the example shown in FIGS. 7 and 8, the first layer 41 and the second layer 42 are connected in series.

An example of the shape of the plasmon generator 20 will now be described with reference to FIGS. 1 to 3. The plasmon generator 20 has a near-field light generating surface 20a located in the medium facing surface 80, a plasmon exciting section 20b which is a bottom surface, a top surface 20c, a rear end face 20d located opposite to the near-field light generating surface 20a, and two side surfaces 20e and 20f. The plasmon exciting section 20b is located at a predetermined distance from the evanescent light generating surface 16b of the core 16 and faces the evanescent light generating surface 16b. The cladding layer 18 is interposed between the evanescent light generating surface 16b and the plasmon exciting section 20b. For example, the plasmon generator 20 is generally rectangular in cross section parallel to the medium facing surface 80. The near-field light generating surface 20a is located between the front end face 30a of the main pole 30 and the front end face 16a of the core 16. The near-field light generating surface 20a generates near-field light on the principle to be described later.

The plasmon generator 20 includes a narrow portion and a wide portion as shown in FIG. 3, the narrow being in the neighborhood of the medium facing surface 80, the wide portion being farther from the medium facing surface 80 than the narrow portion. The narrow portion has a front end face located in the medium facing surface 80. The front end face of the narrow portion also serves as the near-field light generating surface 20a of the plasmon generator 20. The width of the narrow portion in the track width direction (X direction) may be constant regardless of distance from the medium facing surface 80 or decrease with decreasing distance to the medium facing surface 80. The wide portion is located on a side of the narrow portion opposite from the near-field light generating surface 20a and coupled to the narrow portion. The width of the wide portion is equal to that of the narrow portion at the boundary between the narrow portion and the wide portion, and gradually increases with increasing distance from the narrow portion, then becoming constant.

The width (the dimension in the track width direction (the X direction)) of the near-field light generating surface 20a is defined by the width of the narrow portion in the medium facing surface 80. The width of the near-field light generating surface 20a falls within the range of 5 to 40 nm, for example. The height (the dimension in the Z direction) of the near-field light generating surface 20a is defined by the height of the narrow portion in the medium facing surface 80. The height of the near-field light generating surface 20a falls within the range of 5 to 40 nm, for example.

The main pole 30 will now be described in detail with reference to FIGS. 1, 2 and 4. As shown in FIGS. 1 and 2, the front end face 30a of the main pole 30 and the near-field light generating surface 20a of the plasmon generator 20 are at locations different from each other in the direction of travel of the recording medium 90 (the Z direction). In the present embodiment, the front end face 30a is located on the trailing side, i.e., the front side in the direction of travel of the recording medium 90, relative to the near-field light generating surface 20a.

The front end face 30a of the main pole 30 includes a first end face portion 31a, and a second end face portion 32a contiguous with the first end face portion 31a. The second end face portion 32a is located farther from the near-field light generating surface 20a than is the first end face portion 31a, and has a greater width in the track width direction than the first end face portion 31a. In the present embodiment, the second end face portion 32a is located on the front side in the direction of travel of the recording medium 90 relative to the first end face portion 31a. Consequently, the near-field light generating surface 20a, the first end face portion 31a and the second end face portion 32a are arranged in this order along the direction of travel of the recording medium 90.

As shown in FIG. 1, the width of the first end face portion 31a in the track width direction (the X direction) is equal or almost equal to the width of the near-field light generating surface 20a in the track width direction. As will be described in relation to modification examples of the present embodiment, the width of the first end face portion 31a may be either smaller or greater than the width of the near-field light generating surface 20a.

The main pole 30 includes the first portion 31 and the second portion 32 as mentioned previously. As shown in FIGS. 1 and 2, the first portion 31 has the first end face portion 31a, a first rear end face portion 31b farthest from the medium facing surface 80, and a bottom surface 31c. The bottom surface 31c includes a front portion 31c1 and a rear portion 31c2. The rear portion 31c2 is located farther from the medium facing surface 80 than is the front portion 31c1. The gap film 28 and the first insulating film 21 are present between the front portion 31c1 and the top surface 20c of the plasmon generator 20, the gap film 28 being closer to the front portion 31c1 than the first insulating film 21. The gap film 28 is interposed between the rear portion 31c2 and the top surface 20c of the plasmon generator 20.

As shown in FIG. 4, the first portion 31 may include a first narrow portion and a first wide portion, the first narrow portion having the first end face portion 31a and an end opposite thereto, the first wide portion being connected to the end of the first narrow portion. The first wide portion is greater than the first narrow portion in width in the track width direction (the X direction). The width of the first narrow portion in the track width direction is substantially constant regardless of distance from the medium facing surface 80. The width of the first wide portion in the track width direction is equal to that of the first narrow portion at the boundary between the first narrow portion and the first wide portion, and gradually increases with increasing distance from the medium facing surface 80, then becoming constant. The first portion 31 need not necessarily include the first narrow portion. In such a case, the first wide portion has the first end face portion 31a.

As shown in FIGS. 1 and 2, the second portion 32 has the second end face portion 32a, and a second rear end face portion 32b farthest from the medium facing surface 80. The second rear end face portion 32b is located farther from the medium facing surface 80 than is the first rear end face portion 31b.

As shown in FIG. 4, the second portion 32 may include a second narrow portion and a second wide portion, the second narrow portion having the second end face portion 32a and an end opposite thereto, the second wide portion being connected to the end of the second narrow portion. The second wide portion is greater than the second narrow portion in width in the track width direction (the X direction). The width of the second narrow portion in the track width direction is substantially constant regardless of distance from the medium facing surface 80. The width of the second wide portion in the track width direction is equal to that of the second narrow portion at the boundary between the second narrow portion and the second wide portion, and gradually increases with increasing distance from the medium facing surface 80, then becoming constant. The second portion 32 need not necessarily include the second narrow portion. In such a case, the second wide portion has the second end face portion 32a.

Relative locations of the first and second side shields 24A and 24B with respect to the main pole 30 and the plasmon generator 20 will now be described with reference to FIG. 1. As described previously, the first side shield 24A has the first side shield end face 24Aa, and the second side shield 24B has the second side shield end face 24Ba. The first side shield end face 24Aa and the second side shield end face 24Ba are located on opposite sides of at least part of the near-field light generating surface 20a and at least part of the first end face portion 31a in the track width direction such that the at least part of the near-field light generating surface 20a and the at least part of the first end face portion 31a are interposed between the first side shield end face 24Aa and the second side shield end face 24Ba. In the present embodiment, in particular, most part of the near-field light generating surface 20a and most part of the first end face portion 31a are interposed between the first side shield end face 24Aa and the second side shield end face 24Ba, as shown in FIG. 1. The second end face portion 32a is not interposed between the first side shield end face 24Aa and the second side shield end face 24Ba.

Now, the principle of generation of near-field light in the present embodiment and the principle of thermally-assisted magnetic recording using near-field light will be described in detail. Laser light emitted from a laser diode (not illustrated) enters the core 16. As shown in FIG. 5, the laser light 60 propagates through the core 16 toward the medium facing surface 80, and reaches the vicinity of the plasmon generator 20. The evanescent light generating surface 16b of the core 16 generates evanescent light based on the laser light 60 propagating through the core 16. More specifically, the laser light 60 is totally reflected at the evanescent light generating surface 16b, and the evanescent light generating surface 16b thereby generates evanescent light that permeates into the cladding layer 18. In the plasmon generator 20, surface plasmons are excited on the plasmon exciting section 20b through coupling with the aforementioned evanescent light. The surface plasmons propagate to the near-field light generating surface 20a, and the near-field light generating surface 20a generates near-field light based on the surface plasmons.

The near-field light generated from the near-field light generating surface 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 30 for data writing.

The specific functions and effects of the thermally-assisted magnetic recording head according to the present embodiment will now be described. The thermally-assisted magnetic recording head according to the present embodiment has the following features A and B, as structural features.

[Feature A]

The front end face 30a of the main pole 30 includes the first end face portion 31a and the second end face portion 32a, the second end face portion 32a being greater than the first end face portion 31a in width in the track width direction.

[Feature B]

The first side shield end face 24Aa and the second side shield end face 24Ba are located on opposite sides of at least part of the near-field light generating surface 20a and at least part of the first end face portion 31a in the track width direction such that the at least part of the near-field light generating surface 20a and the at least part of the first end face portion 31a are interposed between the first and second side shield end faces 24Aa and 24Ba.

According to the present embodiment, the feature A makes it possible for the main pole 30 to pass a larger amount of magnetic flux when compared with the case where the front end face 30a of the main pole 30 is constituted only of the first end face portion 31a. Consequently, it becomes possible for the main pole 30 to produce a write magnetic field of sufficient magnitude.

Further, according to the present embodiment, the first and second side shields 24A and 24B are able to capture a magnetic flux that is produced from the first end face portion 31a of the front end face 30a of the main pole 30, and to thereby prevent such a magnetic flux from reaching the recording medium 90. As a result, it becomes possible to sharpen the distribution of strength of the write magnetic field in the track width direction. This in turn makes it possible to reduce the track width and thereby increase the track density. Further, the sharpened distribution of strength of the write magnetic field in the track width direction allows for the formation of a magnetization transition region into a shape approximating a rectilinear shape, rather than a curved shape, on the recording medium 90. It is thereby possible to achieve higher linear recording density.

The first and second side shield end faces 24Aa and 24Ba are not extendable to the region where the second end face portion 32a is present. If the first and second side shield end faces 24Aa and 24Ba are located only in the regions on opposite sides of at least part of the first end face portion 31a in the track width direction, the first and second side shield end faces 24Aa and 24Ba would be small in area and consequently, the first and second side shields 24A and 24B may be unable to sufficiently perform their functions.

Since the present embodiment has the feature B, the first and second side shield end faces 24Aa and 24Ba are extended to the regions on opposite sides of at least part of the near-field light generating surface 20a. This allows the first and second side shield end faces 24Aa and 24Ba to be large in area and consequently allows the first and second side shields 24A and 24B to sufficiently perform their functions.

For thermally-assisted magnetic recording, in order to make the track width smaller and thereby achieve a higher recording density, it is particularly effective to sharpen the distribution of strength of the write magnetic field in the track width direction on the thermal spot. The feature B of the present embodiment makes it possible to sharpen the distribution of strength of the write magnetic field in the track width direction on the thermal spot.

For the reasons described above, the present embodiment allows for reduction in track width and production of a write magnetic field of sufficient magnitude from the main pole 30.

According to the present embodiment, the track width can be determined either by the width of the first end face portion 31a or by the thermal spot size. The above-described effect is significantly high in the former case, that is, where the track width is determined by the width of the first end face portion 31a.

Even where the track width is determined by the thermal spot size, the present embodiment allows for enhancement of the strength of the write magnetic field by sharpening the distribution of strength of the write magnetic field in the track width direction in the region on the recording medium 90 where to write data. This makes it possible to make the light spot size smaller by, for example, reducing the power of the laser light for use to generate near-field light, thus making it possible to achieve a smaller thermal spot size. The above-described effect is obtained in this case, too.

Further, the feature B of the present embodiment results in the configuration in which the side shield end faces 24Aa and 24Ba of the side shields 24A and 24B formed of magnetic metal material are present on opposite sides of at least part of the near-field light generating surface 20a in the track width direction. The side shield end faces 24Aa and 24Ba function to suppress the spread of the near-field light generated from the near-field light generating surface 20a Consequently, according to the present embodiment, it becomes possible to enhance the efficiency of generation of near-field light and to reduce the light spot size.

The other effects of the present embodiment will now be described. The thermally-assisted magnetic recording head according to the present embodiment includes the first and second heat sinks 26 and 34. This makes it possible to prevent the heat generated by the plasmon generator 20 from causing deformation of the plasmon generator 20 and/or corrosion of the main pole 30, and consequently makes it possible to increase the reliability of the thermally-assisted magnetic recording head.

In the present embodiment, the gap film 28 includes a portion interposed between the main pole 30 and the plasmon generator 20. Further, the gap film 28 is in contact with the first heat sink 26 and connected to the second heat sink 34 via the nonmagnetic metal film 33. The gap film 28 may be formed of one of nonmagnetic metal, SiC, and AlN. Nonmagnetic metal, SiC, and AlN all have high thermal conductivities. Thus, if the gap film 28 is formed of one of nonmagnetic metal, SiC and MN, the gap film 28 is able to transfer the heat generated by the plasmon generator 20 to the first and second heat sinks 26 and 34. This allows the above-described effect of the first and second heat sinks 26 and 34 to be markedly exerted.

The first insulating film 21 may be omitted if the gap film 28 is formed of an insulating material. In such a case, it is preferred that the gap film 28 be present in only part of the space between the main pole 30 and the plasmon generator 20 near the medium facing surface 80, and that the main pole 30 be in contact with the plasmon generator 20 at a location away from the medium facing surface 80. This allows the heat generated by the plasmon generator 20 to be transferred to the first and second heat sinks 26 and 34 via the main pole 30. A nonmagnetic metal film may be provided between the main pole 30 and the plasmon generator 20.

Further, where the gap film 28 is formed of an insulating material, the gap film 28 is preferably not present between the second heat sink 34 and each of the first side shield 24A and the second side shield 24B. By employing such a configuration, it becomes possible to transfer the heat generated by the plasmon generator 20 to the second heat sink 34 via the first and second side shields 24A and 24B.

A manufacturing method for the thermally-assisted magnetic recording head according to the present embodiment will now be described. The manufacturing method for the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the coupling layer 12 and the first layers of the first coupling sections 13A and 13B are formed on the return pole layer 11. Then, the insulating layer 14 is formed over the entire top surface of the stack. The insulating layer 14 is then polished by, for example, CMP, until the coupling layer 12 and the first layers of the first coupling sections 13A and 13B are exposed.

Next, the cladding layer 15 is formed over the entire top surface of the stack. The cladding layer 15 is then selectively etched to form therein two openings for exposing the top surface of the coupling layer 12 and two openings for exposing the top surfaces of the first layers of the first coupling sections 13A and 13B. Then, the second coupling sections 19A and 19B are formed on the coupling layer 12, and the second layers of the first coupling sections 13A and 13B are formed on the first layers of the first coupling sections 13A and 13B. The core 16 is then formed on the cladding layer 15. The cladding layer 17 is then formed over the entire top surface of the stack. The cladding layer 17 is then polished by, for example, CMP, until the core 16, the second coupling sections 19A and 19B and the second layers of the first coupling sections 13A and 13B are exposed. Then, the cladding layer 18 is formed over the entire top surface of the stack.

Reference is now made to FIG. 9 through FIG. 17B to describe steps to be performed after the formation of the cladding layer 18 up to the formation of the second heat sink 34. FIGS. 9 to 17B each show a stack of layers formed in the process of manufacturing the thermally-assisted magnetic recording head. FIGS. 9 to 17B omit the illustration of portions located below the core 16 and the cladding layer 17. FIGS. 9 to 12 and Fig. nA (n is an integer between 13 and 17 inclusive) each show a cross section corresponding to the medium facing surface 80, that is, a cross section of the stack taken at the location at which the medium facing surface 80 is to be formed. Fig. nB is a perspective view showing part of the stack.

Figure 9:
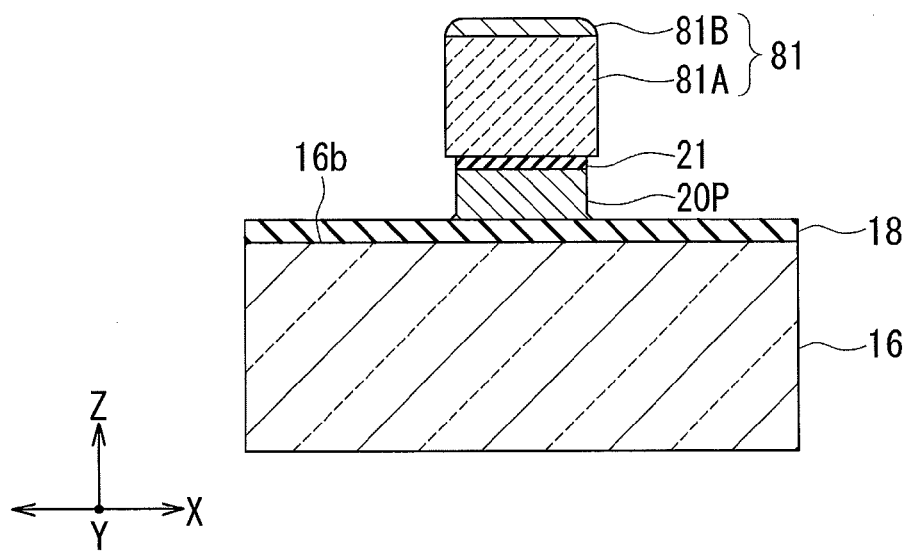
FIG. 9 is a cross-sectional view showing a step of a manufacturing method for the thermally-assisted magnetic recording head according to the first embodiment of the invention.

FIG. 9 shows a step that follows the formation of the cladding layer 18. In this step, first, an initial plasmon generator 20P is formed on the cladding layer 18. Then, the first insulating film 21 is formed selectively on a portion of the top surface of the initial plasmon generator 20P, the portion being at and around the location at which the medium facing surface 80 is to be formed. The first insulating film 21 may be formed by a lift-off process. Alternatively, an initial insulating film may be first formed over the entire top surface of the initial plasmon generator 20 and then the initial insulating film may be patterned by, for example, ion beam etching (hereinafter referred to as IBE) so as to make the initial insulating film into the first insulating film 21.

Next, an etching mask 81 for use to pattern the initial plasmon generator 20P is formed on the initial plasmon generator 20P and the first insulating film 21. The planar shape (the shape as viewed from above) of the etching mask 81 corresponds to that of the plasmon generator 20. FIG. 9 shows an example in which the etching mask 81 includes a first mask layer 81A as its main portion, and a second mask layer 81B lying on the first mask layer 81A. In the cross section corresponding to the medium facing surface 80, the width of the first mask layer 81A in the track width direction (the X direction) is constant or almost constant regardless of distance from the initial plasmon generator 20P. The first mask layer 81A is formed of carbon, alumina, silicon oxide or a photoresist, for example. The second mask layer 81B is formed of Ru, Ta, W, Ni, Ti, Cr or Zr, for example. Alternatively, the entire etching mask 81 may be formed of a photoresist.

The etching mask 81 is formed in the following manner, for example. First, a mask material layer is formed on the initial plasmon generator 20P and the first insulating film 21. Then, the second mask layer 81B, whose planar shape corresponds to that of the plasmon generator 20, is formed on the mask material layer. The mask material layer is then etched by, for example, IBE, using the second mask layer 81B as an etching mask. Where IBE is employed to etch the mask material layer, the ion beams are allowed to travel in a direction at an angle of 90° with respect to the top surface 1a (see FIGS. 5 and 6) of the substrate 1. This makes the mask material layer into the first mask layer 81A.

In the step shown in FIG. 9, the initial plasmon generator 20P and the first insulating film 21 are then etched by, for example, IBE, using the etching mask 81. FIG. 9 shows the initial plasmon generator 20P and the first insulating film 21 having undergone this etching. Where IBE is employed to etch the initial plasmon generator 20P and the first insulating film 21, the ion beams are allowed to travel in the direction at an angle of 90° with respect to the top surface 1a (see FIGS. 5 and 6) of the substrate 1.

Figure 10:
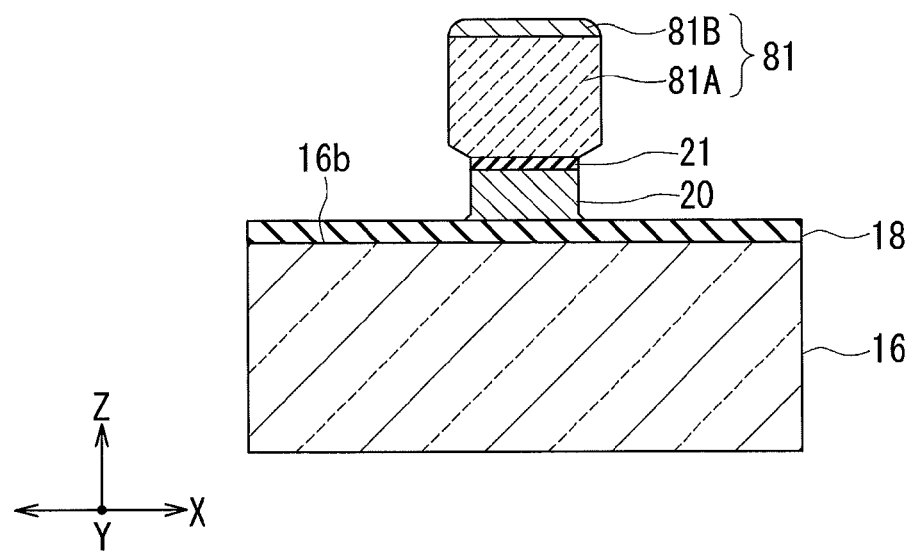
FIG. 10 is a cross-sectional view showing a step that follows the step shown in FIG. 9.

FIG. 10 shows the next step. In this step, the initial plasmon generator 20P and the first insulating film 21 are etched by, for example, IBE using the etching mask 81 so that the plasmon generator 20 will have a smaller width in the track width direction (the X direction) than the width of the etching mask 81 in the track width direction in the cross section corresponding to the medium facing surface 80. This makes the initial plasmon generator 20P into the plasmon generator 20.

The etching mask 81 (the first mask layer 81A) may be formed of a material that is higher in hardness than the initial plasmon generator 20P. In such a case, when IBE is performed to etch the initial plasmon generator 20P, ion beams are projected with the direction of travel of the ion beams allowed to be at varying angles of 5°, 45° and 75° with respect to the top surface 1a (see FIGS. 5 and 6) of the substrate 1. This makes it possible to make the width of the plasmon generator 20 smaller than that of the etching mask 81 in the cross section corresponding to the medium facing surface 80.

FIGS. 9 and 10 show an example in which a portion of the cladding layer 18 that is not covered with the initial plasmon generator 20P is not etched when etching the initial plasmon generator 20P and the first insulating film 21. Alternatively, as will be described later in relation to another embodiment, the portion of the cladding layer 18 not covered with the initial plasmon generator 20P may be etched when etching the initial plasmon generator 20P and the first insulating film 21.

Figure 11:
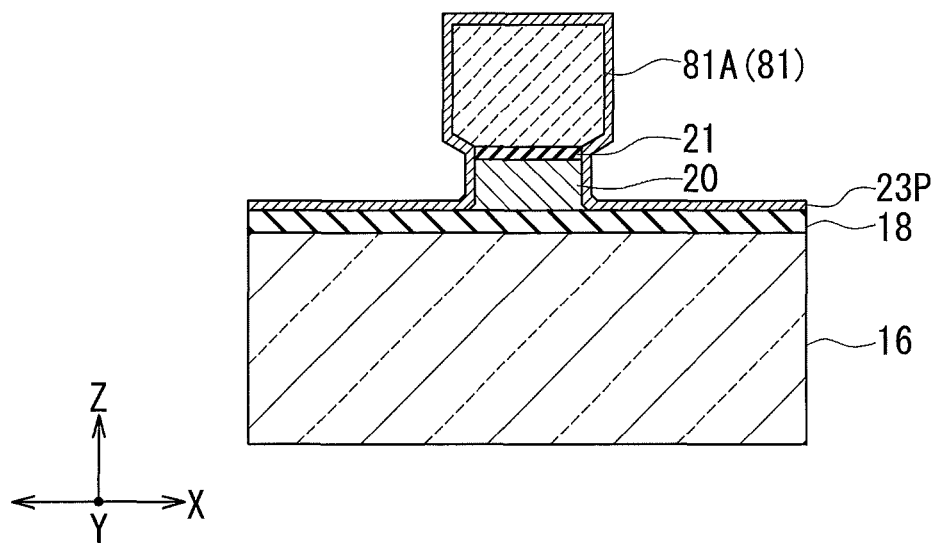
FIG. 11 is a cross-sectional view showing a step that follows the step shown in FIG. 10.

FIG. 11 shows the next step. In this step, first, the second insulating film 22 (see FIGS. 2 and 5) is selectively formed by a lift-off process, for example. The second mask layer 81B is then removed. Next, an initial nonmagnetic film 23P is formed to cover the etching mask 81 (the first mask layer 81A) and the plasmon generator 20 by atomic layer deposition, for example. The initial nonmagnetic film 23P is formed also on the second insulating film 22.

Figure 12:
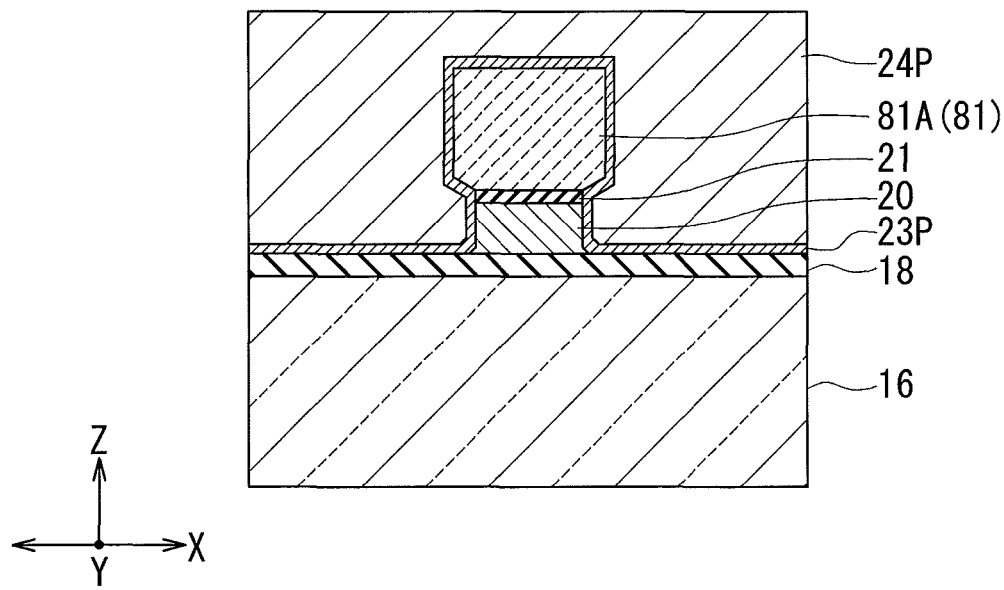
FIG. 12 is a cross-sectional view showing a step that follows the step shown in FIG. 11.

FIG. 12 shows the next step. In this step, first, the cladding layer 18 and the initial nonmagnetic film 23P are selectively etched to form therein two openings for exposing the top surfaces of the second coupling sections 19A and 19B (see FIG. 6). Then, a magnetic layer 24P is formed over the second coupling sections 19A and 19B and the initial nonmagnetic film 23P. The magnetic layer 24P is formed to have a top surface located at a level higher than a portion of the initial nonmagnetic film 23P lying on the etching mask 81 (the first mask layer 81A). Where the initial nonmagnetic film 23P (the nonmagnetic film 23) is formed of a nonmagnetic metal material, the magnetic layer 24P may be formed by plating with the initial nonmagnetic film 23P used as an electrode and a seed. How to form the magnetic layer 24P in the case where the initial nonmagnetic film 23P is formed of an insulating material will be described later in relation to a modification example of the present embodiment.

Figure 13A:
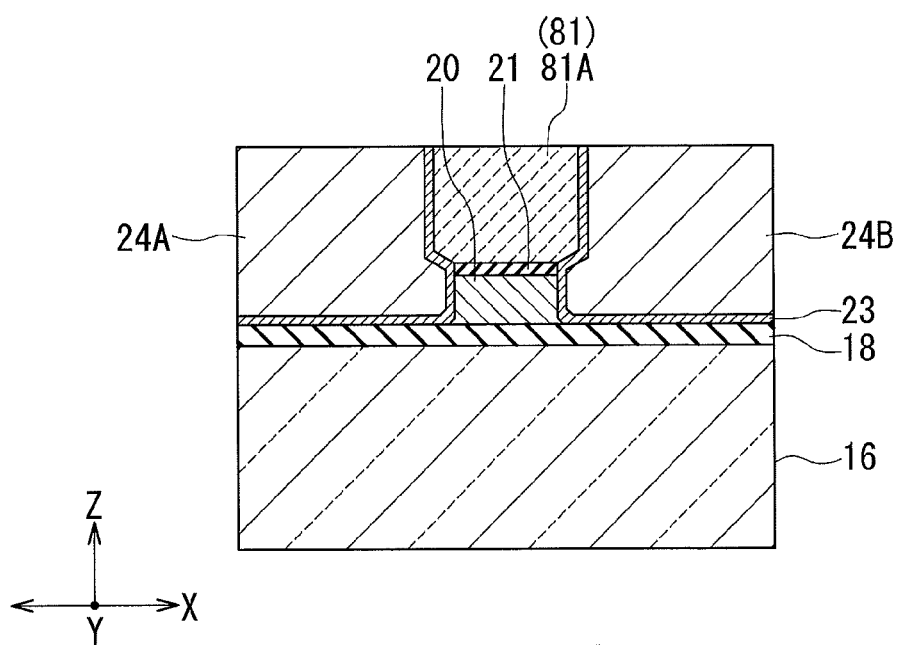
FIG. 13A and FIG. 13B are explanatory diagrams showing a step that follows the step shown in FIG. 12.
Figure 13B:
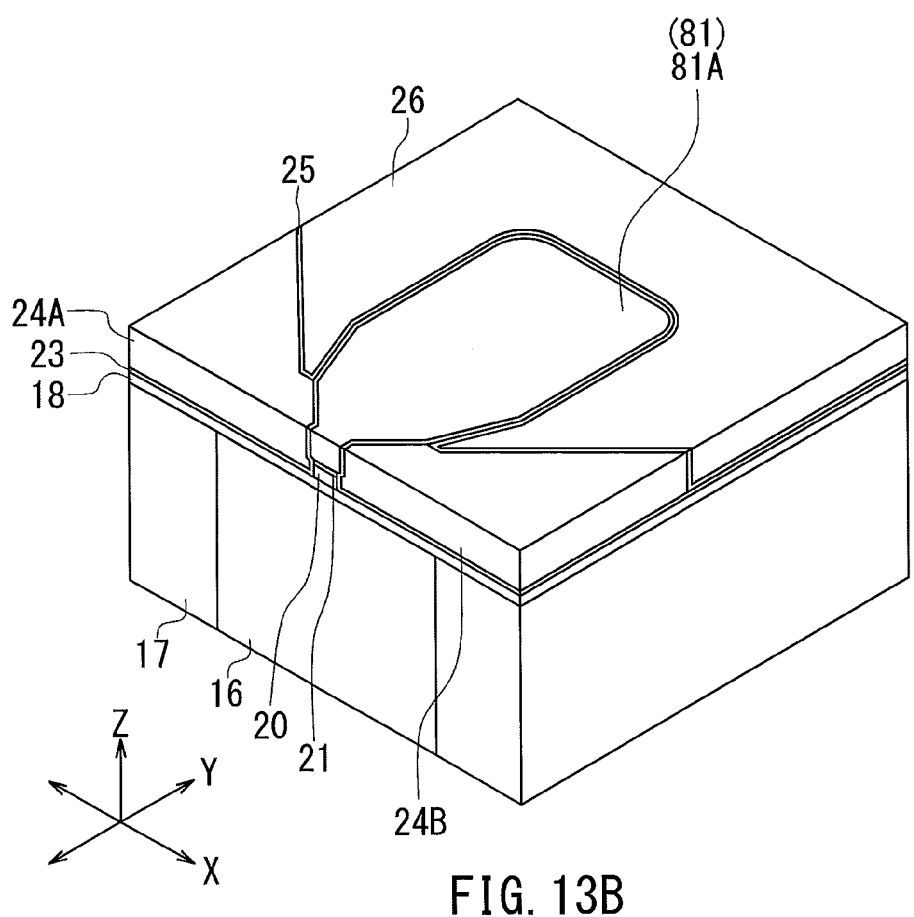

FIGS. 13A and 13B show the next step. In this step, first, the nonmagnetic metal film 25 is formed to cover the magnetic layer 24P and the initial nonmagnetic film 23P by sputtering, for example. Then, a first initial heat sink is formed on the nonmagnetic metal film 25 by frame plating or lift-off process, for example. Then, an initial dielectric layer, which will later become the dielectric layer 27 (see FIG. 5), is formed over the entire top surface of the stack. The magnetic layer 24P, the initial nonmagnetic film 23P, the nonmagnetic metal film 25, the first initial heat sink and the initial dielectric layer are then polished by, for example, CMP, until the etching mask 81 (the first mask layer 81A) is exposed. This makes the magnetic layer 24P into the first and second side shields 24A and 24B, makes the initial nonmagnetic film 23P into the nonmagnetic film 23, makes the first initial heat sink into the first heat sink 26, and makes the initial dielectric layer into the dielectric layer 27.

Figure 14A:
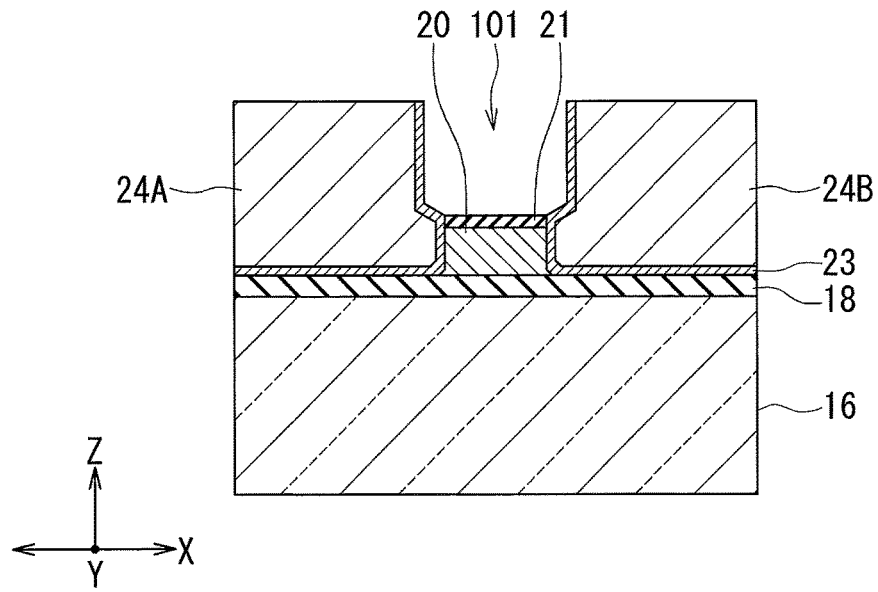
FIG. 14A and FIG. 14B are explanatory diagrams showing a step that follows the step shown in FIGS. 13A and 13B.
Figure 14B:
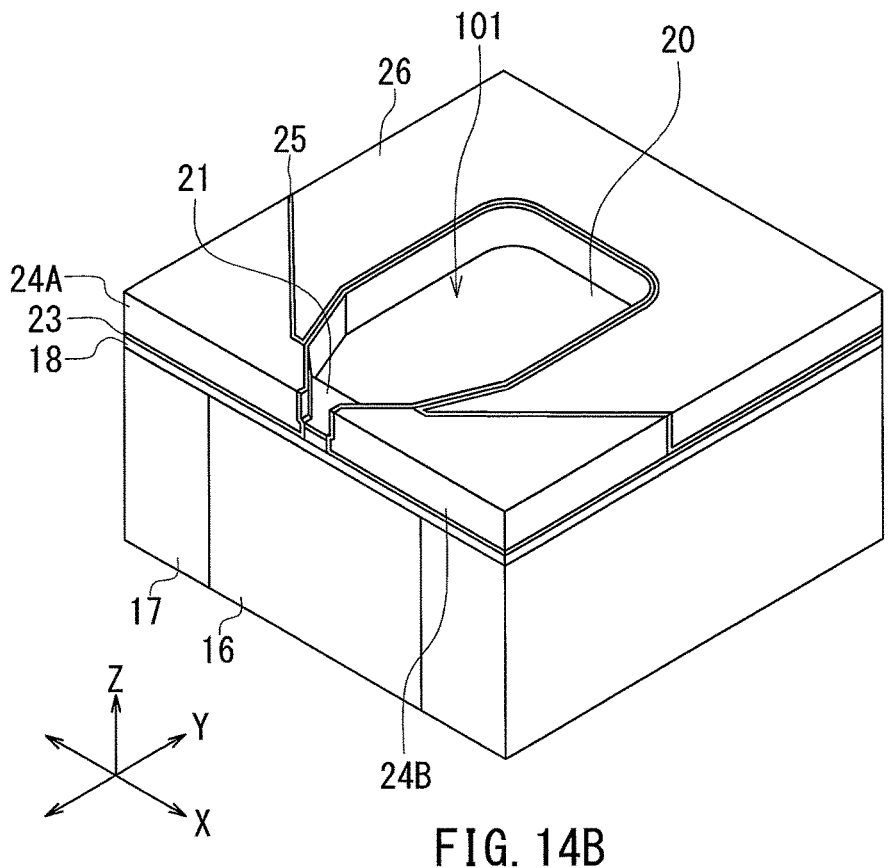

FIGS. 14A and 14B show the next step. In this step, the etching mask 81 (the first mask layer 81A) is removed. Where the first mask layer 81A is formed of carbon or a photoresist, removal of the first mask layer 81A is effected by ashing, for example.

Through a series of steps from the step shown in FIGS. 13A and 13B to the step shown in FIGS. 14A and 14B, the magnetic layer 24P is processed into the first and second side shields 24A and 24B and at least part of the etching mask 81 is removed. The series of steps corresponds to the processing step of the present invention. In the present embodiment, the processing step includes the step of polishing the magnetic layer 24P until the etching mask 81 is exposed, and the step of removing the etching mask 81 after the step of polishing the magnetic layer 24P. As shown in FIGS. 14A and 14B, the processing step results in the formation of a structure having a recess 101, the structure including the plasmon generator 20 and the first and second side shields 24A and 24B. According to the present embodiment, in the cross section corresponding to the medium facing surface 80, the width in the track width direction (the X direction) of the recess 101 excluding a portion near the first insulating film 21 is constant or almost constant regardless of distance from the plasmon generator 20.

Figure 15A:
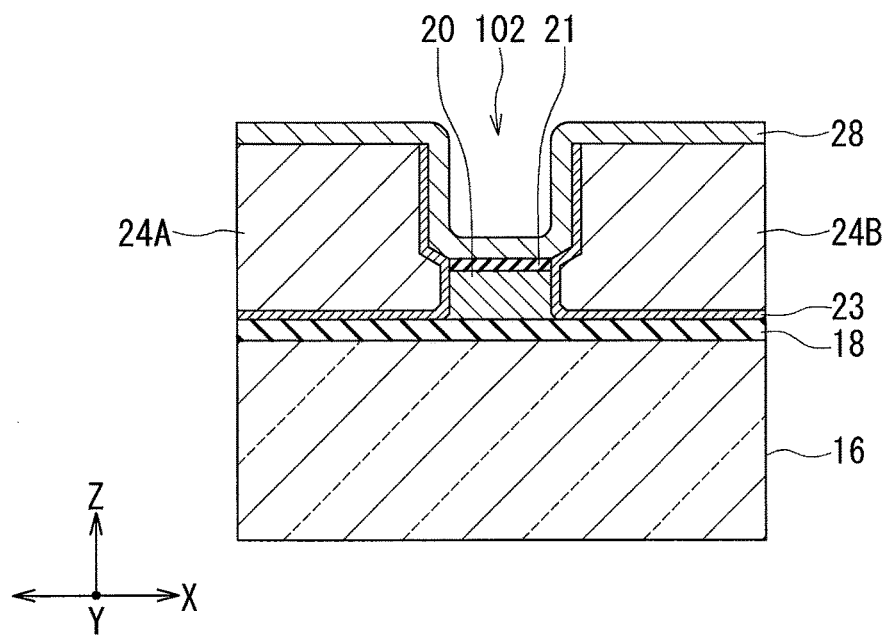
FIG. 15A and FIG. 15B are explanatory diagrams showing a step that follows the step shown in FIGS. 14A and 14B.
Figure 15B:
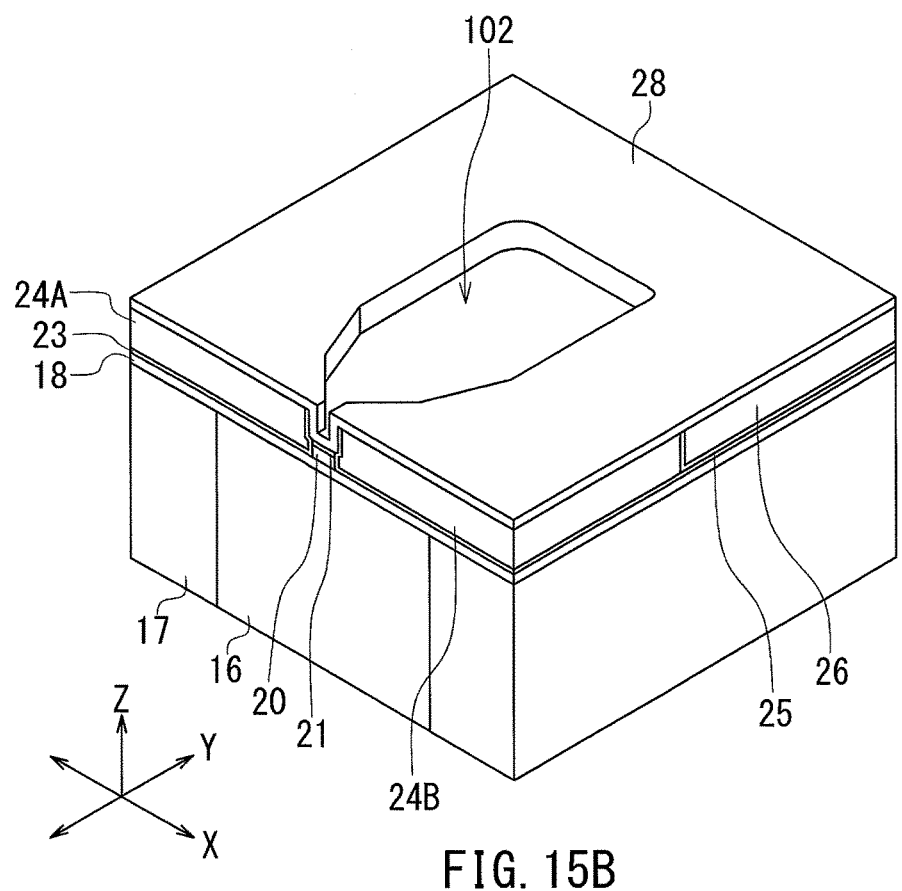

FIGS. 15A and 15B show the next step. In this step, the gap film 28 is formed on the aforementioned structure by atomic layer deposition, for example. The gap film 28 forms a receiving section 102 shaped to correspond to the recess 101 shown in FIGS. 14A and 14B. According to the present embodiment, in the cross section corresponding to the medium facing surface 80, the width of the receiving section 102 in the track width direction (the X direction) is constant or almost constant regardless of distance from the plasmon generator 20. Further, in the cross section corresponding to the medium facing surface 80, the width of the receiving section 102 in the track width direction is equal or almost equal to the width of the plasmon generator 20 in the track width direction.

Figure 16A:
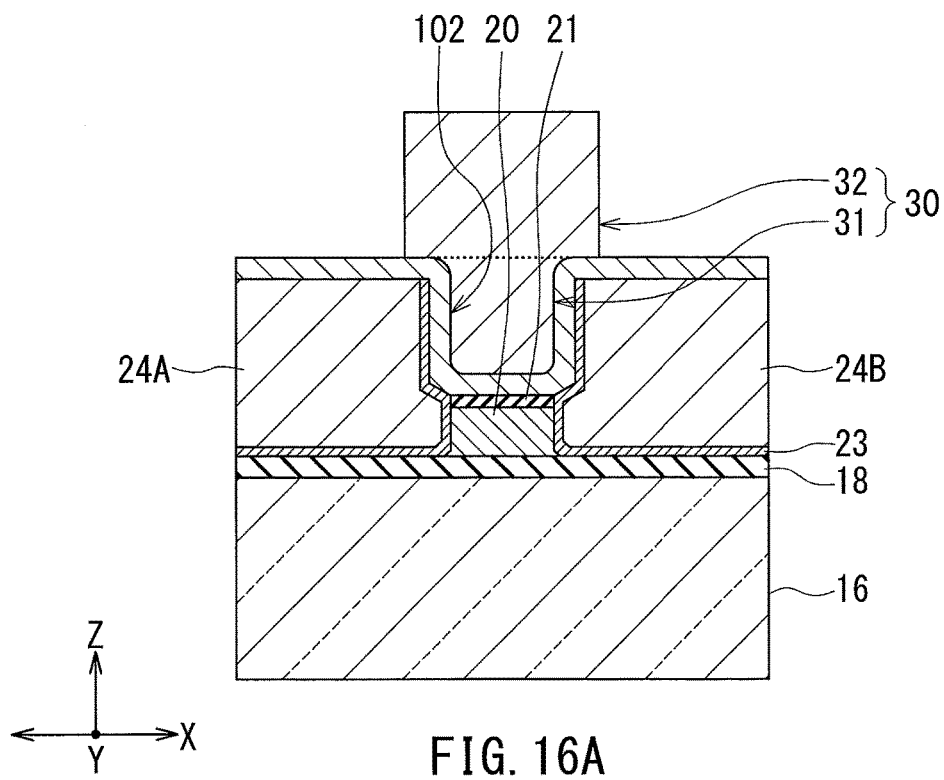
FIG. 16A and FIG. 16B are explanatory diagrams showing a step that follows the step shown in FIGS. 15A and 15B.
Figure 16B:
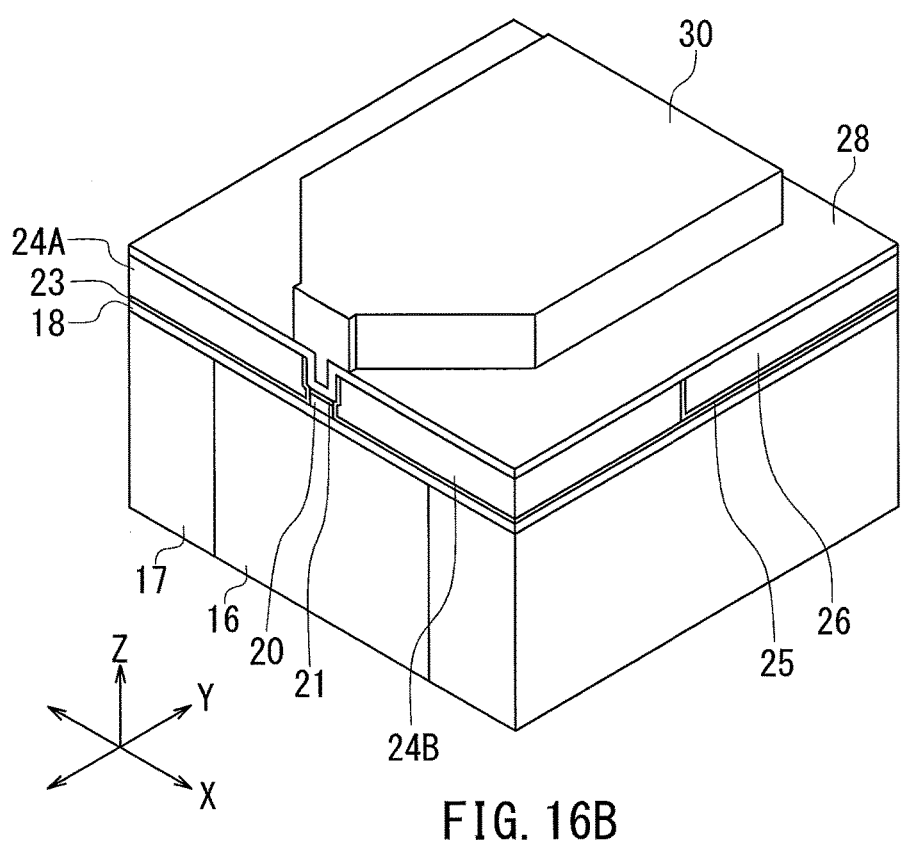

FIGS. 16A and 16B show the next step. In this step, first, a seed layer (not illustrated) is formed on the gap film 28. Then, the main pole 30 is formed by plating, using the seed layer as an electrode and a seed. The main pole 30 is formed on the gap film 28 such that the first portion 31 of the main pole 30 is received in the receiving section 102. Then, a portion of the seed layer not covered with the main pole 30 is removed by, for example, IBE using the main pole 30 as an etching mask.

Figure 17A:
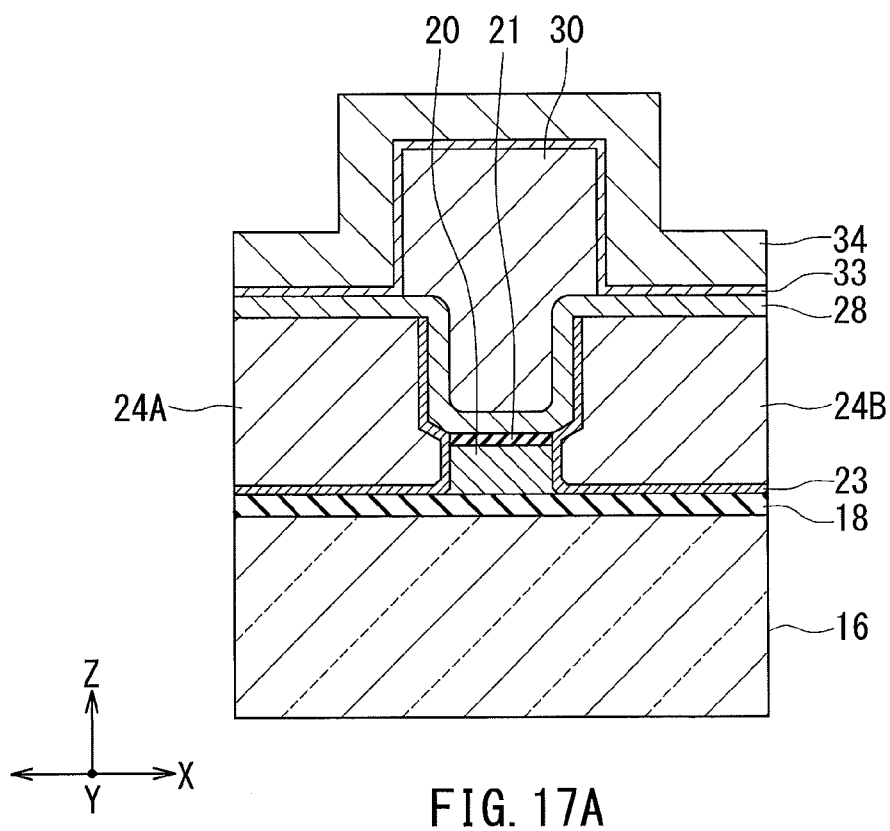
FIG. 17A and FIG. 17B are explanatory diagrams showing a step that follows the step shown in FIGS. 16A and 16B.
Figure 17B:
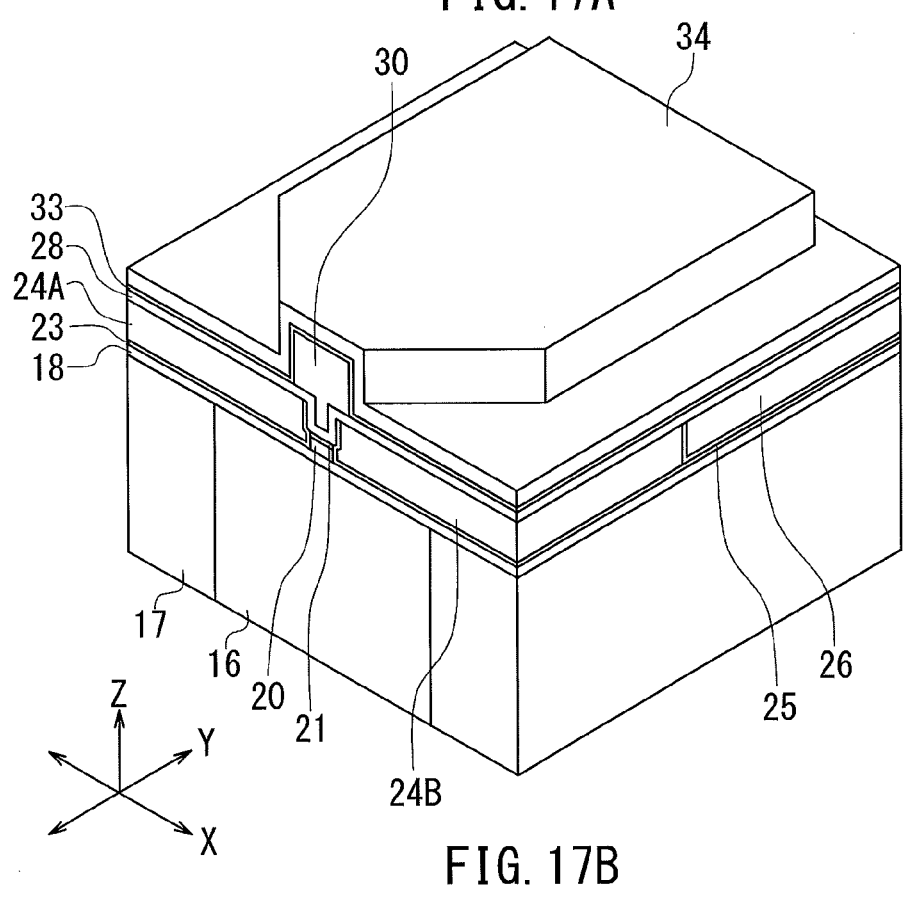

FIGS. 17A and 17B show the next step. In this step, first, the nonmagnetic metal film 33 is formed to cover the main pole 30 and the gap film 28 by sputtering, for example. Then, the second heat sink 34 is formed on the nonmagnetic metal film 33 by frame plating or lift-off process, for example.

Now, steps to follow the step shown in FIGS. 17A and 17B will be described with reference to FIGS. 5 and 6. First, the cladding layer 18 and the dielectric layer 27 are selectively etched to form therein two openings for exposing the top surfaces of the second layers of the first coupling sections 13A and 13B. Then, the third layers of the first coupling sections 13A and 13B are formed on the second layers of the first coupling sections 13A and 13B, respectively. Next, the dielectric layer 35 is formed over the entire top surface of the stack. The second heat sink 34, the nonmagnetic metal film 33 and the dielectric layer 35 are then polished by, for example, CMP, until the main pole 30 and the third layers of the first coupling sections 13A and 13B are exposed.

Next, a non-illustrated nonmagnetic metal film is formed on the second heat sink 34. Then, the coupling layer 36 is formed over the main pole 30, the dielectric layer 35 and the non-illustrated nonmagnetic metal film, and the coupling layer 37 is formed over the third layers of the first coupling sections 13A and 13B and the dielectric layer 35. Next, the dielectric layer 38 is formed over the entire top surface of the stack. The dielectric layer 38 is then polished by, for example, CMP, until the coupling layer 36 and the coupling layer 37 are exposed.

Next, the coupling layer 43 is formed on the coupling layer 36, and the coupling layer 44 is formed on the coupling layer 37. The insulating film 45 is then formed over the entire top surface of the stack. The first layer 41 of the coil 40 is then formed on the insulating film 45. Next, the insulating layer 46 is formed over the entire top surface of the stack. The insulating film 45 and the insulating layer 46 are then polished by, for example, CMP, until the coupling layers 43 and 44 and the first layer 41 are exposed.

Next, the insulating layer 47 is formed on the first layer 41 of the coil 40 and the insulating layer 46. Then, the coupling layer 48 is formed on the coupling layer 43, and the coupling layer 49 is formed on the coupling layer 44. Next, the insulating film 50 is formed over the entire top surface of the stack. The insulating layer 47 and the insulating film 50 are then selectively etched to form therein openings for exposing the coil connection 41E (see FIG. 7) of the first layer 41 of the coil 40. Then, the second layer 42 of the coil 40 is formed on the insulating film 50 and the coil connection 41E. Next, the insulating layer 51 is formed over the entire top surface of the stack. The insulating film 50 and the insulating layer 51 are then polished by, for example, CMP, until the coupling layers 48 and 49 and the second layer 42 are exposed.

Next, the insulating layer 52 is formed on the second layer 42 of the coil 40 and the insulating layer 51. The yoke layer 53 is then formed over the coupling layers 48 and 49 and the insulating layer 52. Next, the insulating layer 54 is formed over the entire top surface of the stack. The insulating layer 54 is then polished by, for example, CMP, until the yoke layer 53 is exposed. Then, the protective layer 55 is formed to cover the yoke layer 53 and the insulating layer 54. Wiring, terminals, and other components are then formed on the top surface of the protective layer 55. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

The effects of the manufacturing method for the thermally-assisted magnetic recording head according to the present embodiment will now be described. The manufacturing method for the thermally-assisted magnetic recording head according to the present embodiment has the following features C and D.

[Feature C]

The first and second side shields 24A and 24B are formed to be precisely aligned with the plasmon generator 20 in a self-aligned manner by forming the magnetic layer 24P after the formation of the plasmon generator 20. Further, the main pole 30 is formed such that the first portion 31 is received in the receiving section 102 after the formation of the first and second side shields 24A and 24B. The main pole 30 is thereby precisely aligned with the first and second side shields 24A and 24B in a self-aligned manner. As a result, the main pole 30 is precisely aligned with the plasmon generator 20.

[Feature D]

The gap film 28 is formed to provide the receiving section 102. The main pole 30 is formed on the gap film 28 after the step of forming the gap film 28.

According to the present embodiment, by virtue of the feature C, there is no need to increase the widths of the plasmon generator 20 and the main pole 30 in the track width direction in consideration of a margin for misalignment between the plasmon generator 20 and the main pole 30. The present embodiment thus allows for a reduction in track width.

Further, according to the present embodiment, the feature D makes it possible that the first portion 31 and the second portion 32 of the main pole 30 are formed simultaneously, and that the main pole 30, particularly the second portion 32 thereof, is separated from the first and second side shields 24A and 24B with reliability by the gap film 28.

Now, we will discuss a manufacturing method for a thermally-assisted magnetic recording head of a comparative example. The manufacturing method of the comparative example may be a method in which the first portion 31 of the main pole 30 and the first and second side shields 24A and 24B are formed such that their top surfaces are even with each other, and thereafter the second portion 32 of the main pole 30 is formed. This method would suffer from the problem that the second portion 32 may become misaligned to come into contact with the first or second side shield 24A or 24B, and magnetic flux may thus leak from the main pole 30 to the first or second side shield 24A or 24B. In contrast, the present embodiment is free from such a problem by virtue of the feature D.

Modification Examples

Figure 18:
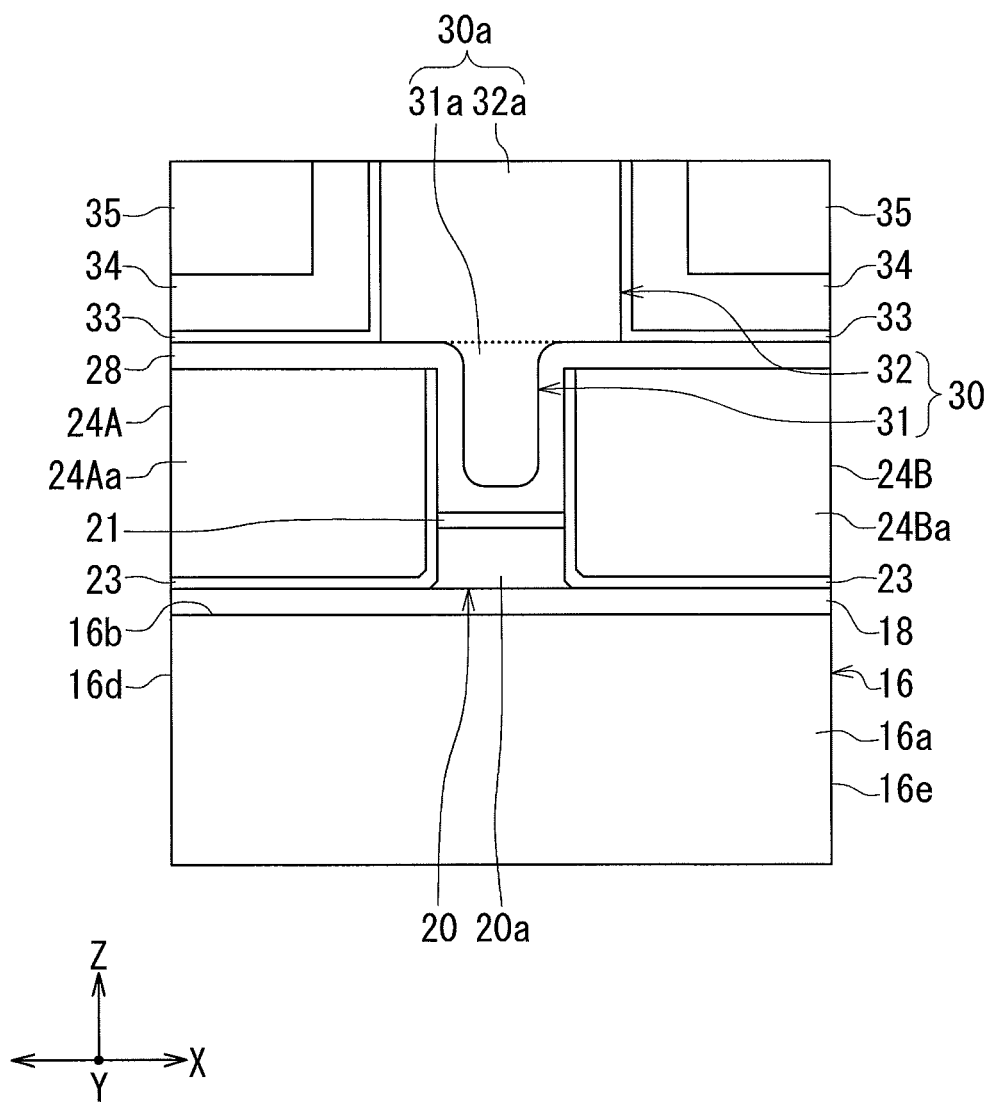
FIG. 18 is a front view showing a first modification example of the thermally-assisted magnetic recording head according to the first embodiment of the invention.

A first to a third modification example of the present embodiment will now be described with reference to FIG. 18 to FIG. 20. FIG. 18 is a front view showing the first modification example of the thermally-assisted magnetic recording head according to the present embodiment. In the first modification example, the first end face portion 31a of the front end face 30a of the main pole 30 has a smaller width in the track width direction (the X direction) than does the near-field light generating surface 20a of the plasmon generator 20. The first end face portion 31a of such a shape can be formed, for example, by omitting the step shown in FIG. 10. More specifically, in the cross section corresponding to the medium facing surface 80, the width of the initial plasmon generator 20P after the step shown in FIG. 9 is almost equal to the width of the etching mask 81. Then, performing the steps shown in FIGS. 11 through 15B without performing the step shown in FIG. 10 results in a smaller width of the receiving section 102 than the width of the plasmon generator 20 in the cross section corresponding to the medium facing surface 80, the difference therebetween corresponding to the thickness of the gap film 28. Thereafter, in the same manner as the step shown in FIGS. 16A and 16B, the main pole 30 is formed such that the first portion 31 is received in the receiving section 102. This makes the first end face portion 31a smaller in width than the near-field light generating surface 20a.

Figure 19:
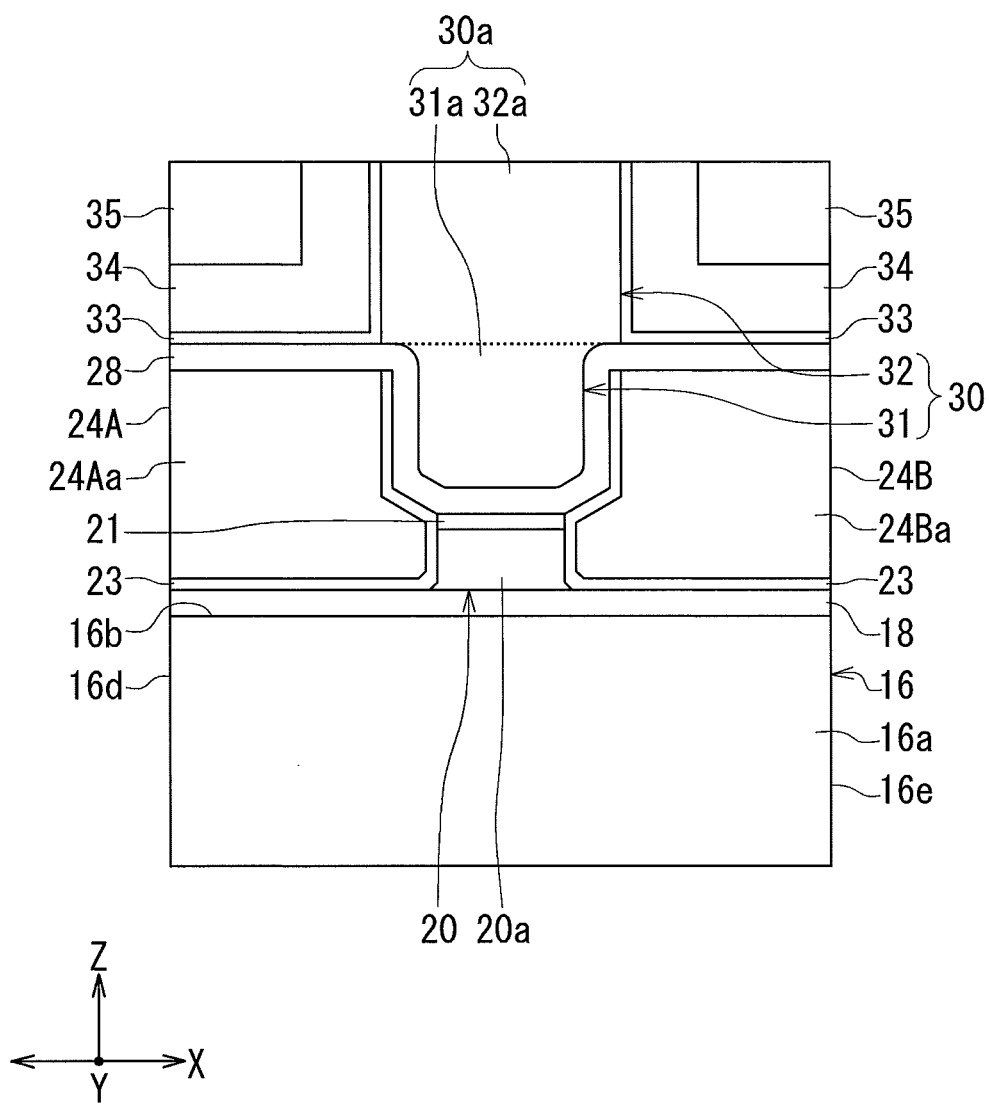
FIG. 19 is a front view showing a second modification example of the thermally-assisted magnetic recording head according to the first embodiment of the invention.

FIG. 19 is a front view showing the second modification example of the thermally-assisted magnetic recording head according to the present embodiment. In the second modification example, the first end face portion 31a of the front end face 30a of the main pole 30 has a greater width in the track width direction (the X direction) than does the near-field light generating surface 20a of the plasmon generator 20. The first end face portion 31a of such a shape can be formed in the following manner, for example. In the step shown in FIG. 10, the relative width of the plasmon generator 20 with respect to the width of the etching mask 81 in the cross section corresponding to the medium facing surface 80 is made smaller than that in the example shown in FIG. 10. More specifically, for example, the width of the etching mask 81 may be made greater than in the example shown in FIG. 10 while allowing the plasmon generator 20 after etching to have the same width as that in the example shown in FIG. 10. Then, as a result of performing the steps shown in FIGS. 11 through 15B, the relative width of the receiving section 102 with respect to the width of the plasmon generator 20 in the cross section corresponding to the medium facing surface 80 becomes greater than that in the example shown in FIG. 15A. Thereafter, in the same manner as the step shown in FIGS. 16A and 16B, the main pole 30 is formed such that the first portion 31 is received in the receiving section 102. This makes the first end face portion 31a greater in width than the near-field light generating surface 20a.

Figure 20:
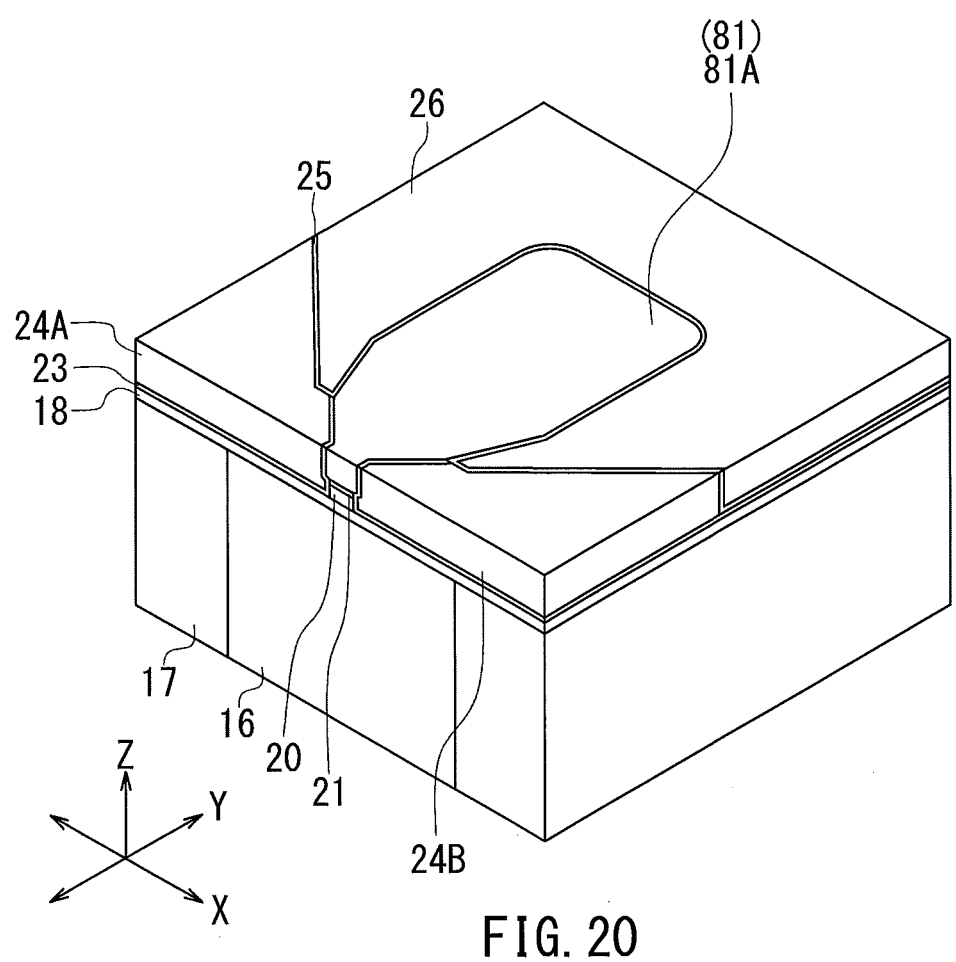
FIG. 20 is a perspective view showing a third modification example of the thermally-assisted magnetic recording head according to the first embodiment of the invention.

FIG. 20 is a perspective view illustrating the third modification example of the thermally-assisted magnetic recording head according to the present embodiment. This figure shows part of a stack of layers formed in the process of manufacturing the thermally-assisted magnetic recording head. In the third modification example, the nonmagnetic film 23 is formed of an insulating material. Further, the step of forming the magnetic layer 24P in the third modification example is different from that shown in FIG. 12. More specifically, in the third modification example, a seed layer is formed over the second coupling sections 19A and 19B (see FIG. 6) and the initial nonmagnetic film 23P (see FIG. 12) prior to the formation of the magnetic layer 24P. Then, the magnetic layer 24P is formed by plating, using the seed layer as an electrode and a seed. Next, portions of the seed layer and the initial nonmagnetic film 23P that are not covered with the magnetic layer 24P are removed by, for example, IBE using the magnetic layer 24P as an etching mask.

Next, as in the manufacturing method for the thermally-assisted magnetic recording head according to the present embodiment, the nonmagnetic metal film 25, the first initial heat sink and the initial dielectric layer are formed in this order, and then the magnetic layer 24P, the initial nonmagnetic film 23P, the nonmagnetic metal film 25, the first initial heat sink and the initial dielectric layer are polished. This makes the magnetic layer 24P into the first and second side shields 24A and 24B, makes the initial nonmagnetic film 23P into the nonmagnetic film 23, makes the first initial heat sink into the first heat sink 26, and the initial dielectric layer into the dielectric layer 27. FIG. 20 shows the stack having undergone the polishing of the magnetic layer 24P, the initial nonmagnetic film 23P, the first initial heat sink and the initial dielectric layer.

In the third modification example, as described above, the portion of the initial nonmagnetic film 23P not covered with the magnetic layer 24P is removed before the formation of the first initial heat sink. Consequently, in the third modification example, the nonmagnetic film 23 is not present between the first heat sink 26 and the first portion 31 of the main pole 30.

Second Embodiment

Figure 21:
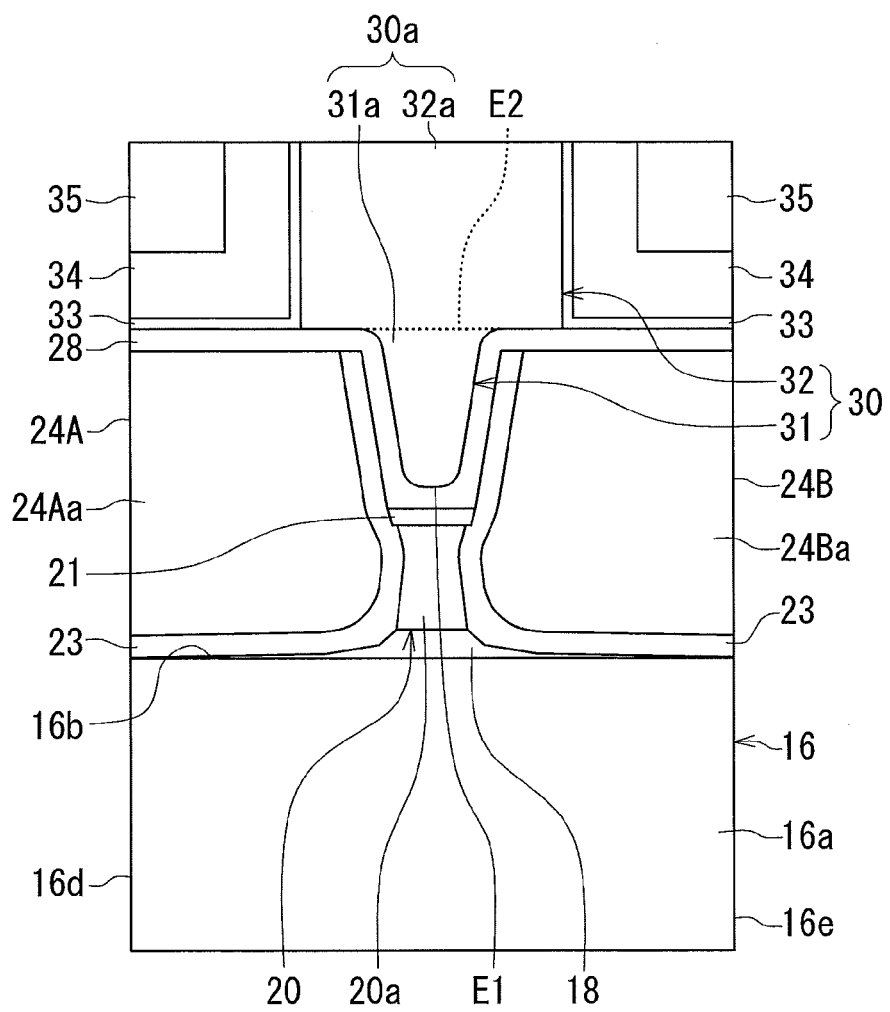
FIG. 21 is a front view showing the main part of a thermally-assisted magnetic recording head according to a second embodiment of the invention.

A thermally-assisted magnetic recording head according to a second embodiment of the invention will now be described with reference to FIG. 21. FIG. 21 is a front view showing the main part of the thermally-assisted magnetic recording head according to the present embodiment. In the present embodiment, the first end face portion 31a of the front end face 30a of the main pole 30 is shaped differently than in the first embodiment. More specifically, in the present embodiment, the width of the first end face portion 31a in the track width direction (the X direction) increases with increasing distance from the near-field light generating surface 20a of the plasmon generator 20. Further, the first end face portion 31a has a first edge E1 closest to the near-field light generating surface 20a, and a second edge E2 located at the boundary between the first end face portion 31a and the second end face portion 32a. As shown in FIG. 21, the second edge E2 is longer than the first edge E1.

Given the first edge E1 of the same length, the first end face portion 31a has a larger area in the present embodiment than in the case where the width of the first end face portion 31a is constant regardless of distance from the near-field light generating surface 20a as in the first embodiment. Consequently, the present embodiment makes it possible for the main pole 30 to guide a larger amount of magnetic flux to the vicinity of the near-field light generating surface 20a.

A manufacturing method for the thermally-assisted magnetic recording head according to the present embodiment will now be described with reference to FIGS. 22 to 27. FIGS. 22 to 27 each show a stack of layers formed in the process of manufacturing the thermally-assisted magnetic recording head. FIGS. 22 to 27 omit the illustration of portions located below the core 16 and the cladding layer 17. FIGS. 22 to 27 each show a cross section corresponding to the medium facing surface 80 (see FIG. 5), that is, a cross section of the stack taken at the location at which the medium facing surface 80 is to be formed.

Figure 22:
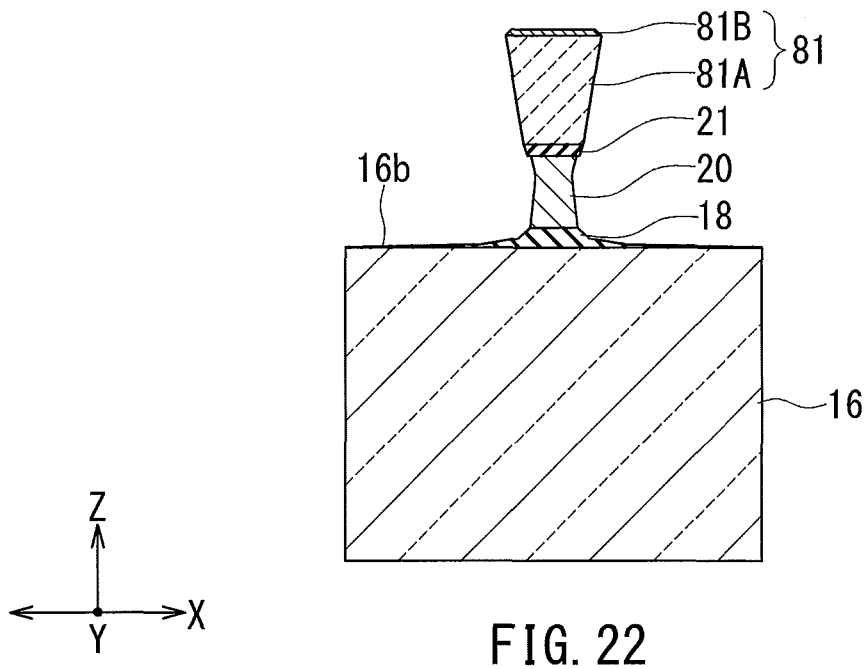
FIG. 22 is a cross-sectional view showing a step of a manufacturing method for the thermally-assisted magnetic recording head according to the second embodiment of the invention.

The manufacturing method for the thermally-assisted magnetic recording head according to the present embodiment is the same as the method according to the first embodiment up to the step of forming the etching mask 81 (see FIG. 9). FIG. 22 shows the next step. In this step, the initial plasmon generator 20P (see FIG. 9) and the first insulating film 21 are etched by, for example, IBE using the etching mask 81 so that the plasmon generator 20 will have a smaller width in the track width direction (the X direction) than the width of the etching mask 81 in the track width direction. This makes the initial plasmon generator 20P into the plasmon generator 20. Further, a portion of the first mask layer 81A of the etching mask 81 is etched simultaneously with the etching of the initial plasmon generator 20P and the first insulating film 21 so that the width of the first mask layer 81A in the track width direction decreases toward the plasmon generator 20 in the cross section corresponding to the medium facings surface 80.

Where IBE is employed to etch the initial plasmon generator 20P and the first insulating film 21, ion beams are projected to travel in a direction at an angle of 90° with respect to the top surface 1a (see FIGS. 5 and 6) of the substrate 1. This allows the plasmon generator 20 to have a smaller width than the etching mask 81, and also allows the width of the first mask layer 81A to decrease toward the plasmon generator 20.

FIG. 22 shows an example in which the portion of the cladding layer 18 not covered with the initial plasmon generator 20P is etched simultaneously with the etching of the initial plasmon generator 20P and the first insulating film 21.

Figure 23:
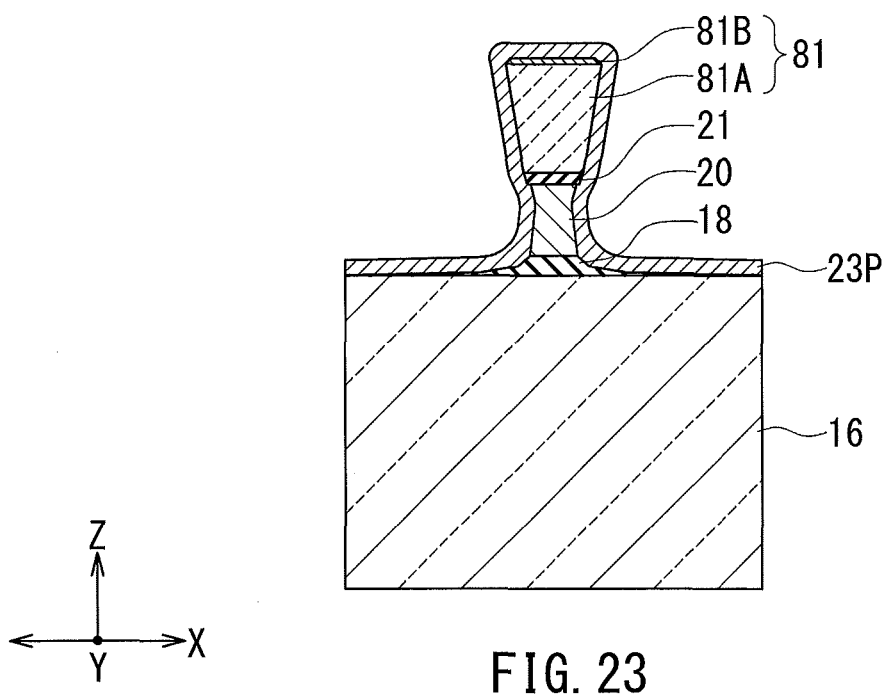
FIG. 23 is a cross-sectional view showing a step that follows the step shown in FIG. 22.

FIG. 23 shows the next step. In this step, first, the second insulating film 22 (see FIGS. 2 and 5) is formed in the same manner as in the step of FIG. 11 in the first embodiment. Then, the initial nonmagnetic film 23P is formed to cover the etching mask 81 and the plasmon generator 20 by atomic layer deposition, for example. In the present embodiment, the initial nonmagnetic film 23P is formed with the second mask layer 81B of the etching mask 81 left unremoved.

Figure 24:
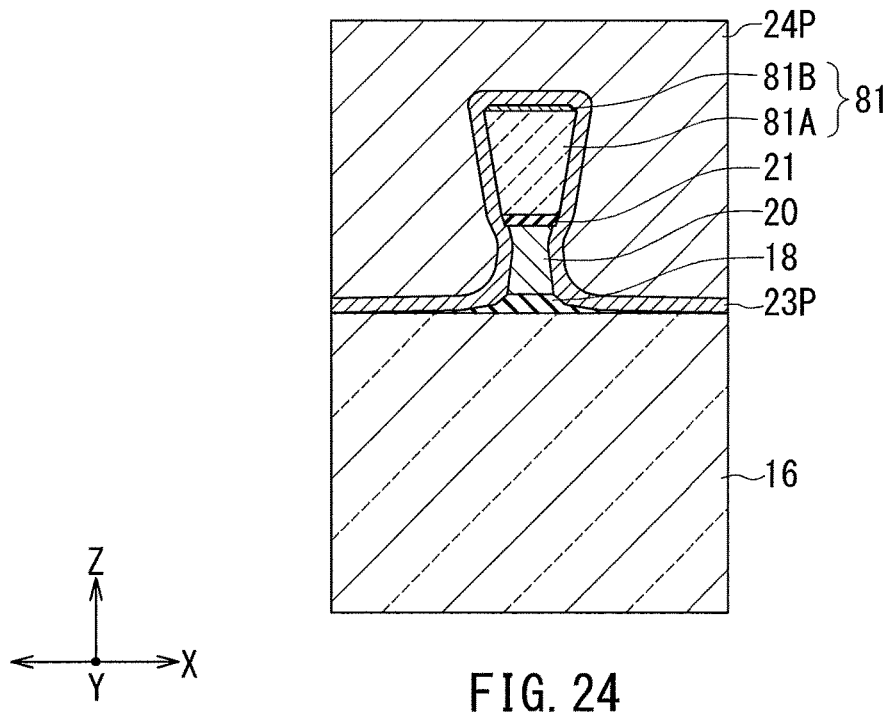
FIG. 24 is a cross-sectional view showing a step that follows the step shown in FIG. 23.

FIG. 24 shows the next step. In this step, in the same manner as in the step of FIG. 12 in the first embodiment, two openings for exposing the top surfaces of the second coupling sections 19A and 19B (see FIG. 6) are formed in the cladding layer 18 and the initial nonmagnetic film 23P, and then the magnetic layer 24P is formed.

Figure 25:
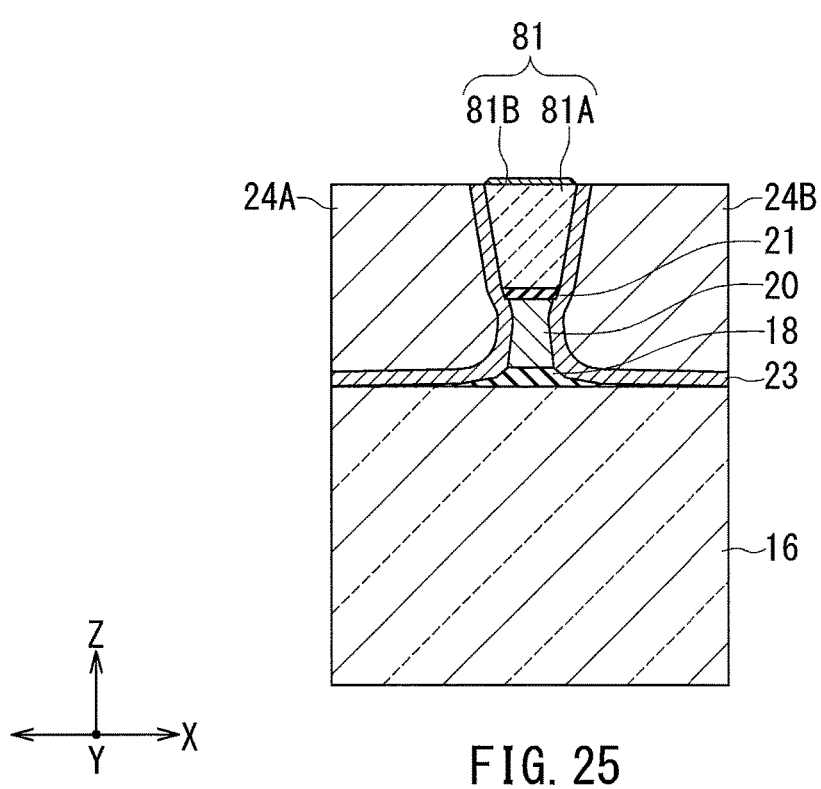
FIG. 25 is a cross-sectional view showing a step that follows the step shown in FIG. 24.

FIG. 25 shows the next step. In this step, in the same manner as in the step of FIGS. 13A and 13B in the first embodiment, the nonmagnetic metal film 25, the first initial heat sink and the initial dielectric layer are formed in this order and then the magnetic layer 24P, the initial nonmagnetic film 23P, the nonmagnetic metal film 25, the first initial heat sink and the initial dielectric layer are polished until the etching mask 81 is exposed. This makes the magnetic layer 24P into the first and second side shields 24A and 24B, makes the initial nonmagnetic film 23P into the nonmagnetic film 23, makes the first initial heat sink into the first heat sink 26 (see FIG. 13B), and makes the initial dielectric layer into the dielectric layer 27 (see FIG. 5). It should be noted that a difference in level between the top surface of the second mask layer 81B and the top surfaces of the first and second side shields 24A and 24B can develop due to a difference in polishing rate between the second mask layer 81B and the magnetic layer 24P.

Figure 26:
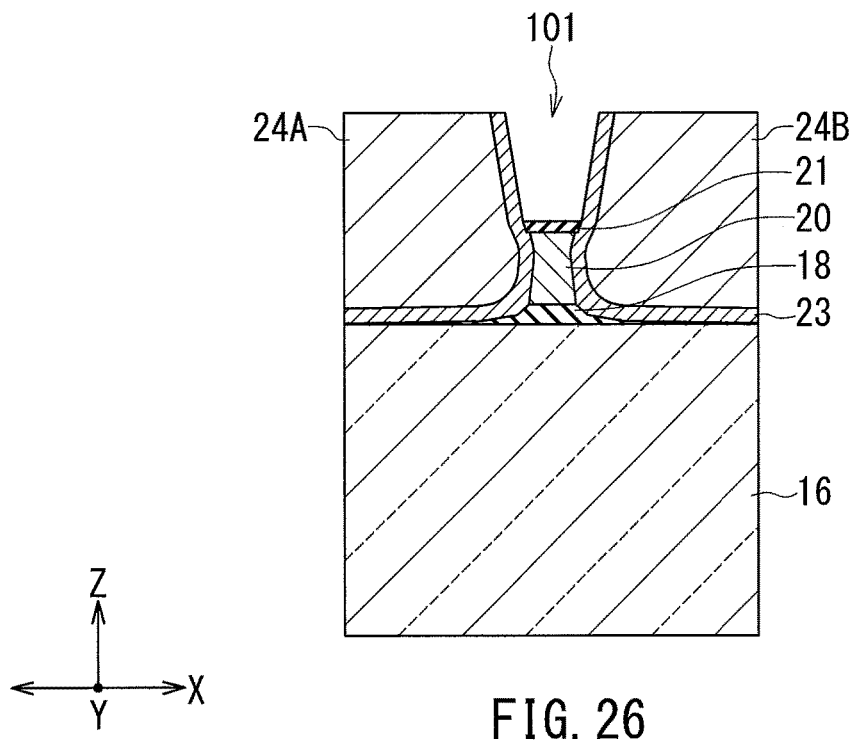
FIG. 26 is a cross-sectional view showing a step that follows the step shown in FIG. 25.

FIG. 26 shows the next step. In this step, the etching mask 81 is removed. This results in the formation of a structure having a recess 101, the structure including the plasmon generator 20 and the first and second side shields 24A and 24B. According to the present embodiment, the width of the recess 101 in the track width direction (the X direction) decreases toward the plasmon generator 20 in the cross section corresponding to the medium facing surface 80.

Figure 27:
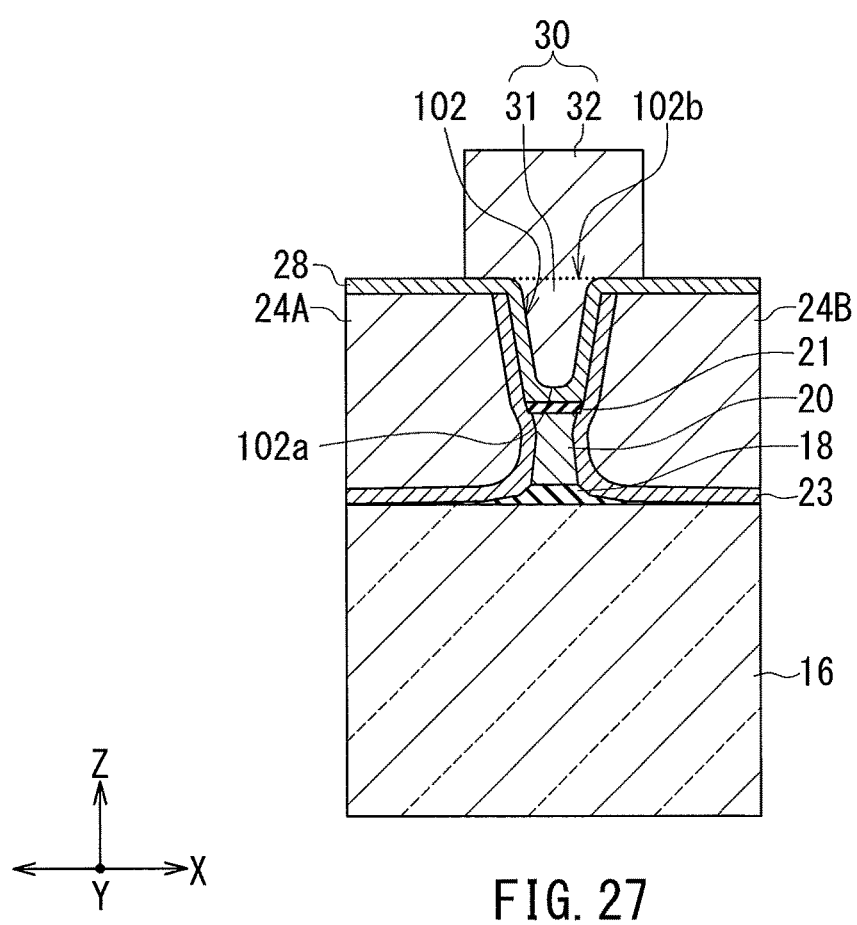
FIG. 27 is a cross-sectional view showing a step that follows the step shown in FIG. 26.

FIG. 27 shows the next step. In this step, first, the gap film 28 is formed on the aforementioned structure by atomic layer deposition, for example. The gap film 28 forms the receiving section 102 shaped to correspond to the recess 101 shown in FIG. 26. The receiving section 102 has a bottom 102a closest to the plasmon generator 20, and an opening 102b farthest from the plasmon generator 20. As shown in FIG. 27, the bottom 102a is smaller than the opening 102b in width in the track width direction (the X direction) in the cross section corresponding to the medium facing surface 80. Then, in the same manner as in the step of FIGS. 16A and 16B in the first embodiment, the main pole 30 is formed such that the first portion 31 is received in the receiving section 102. The subsequent steps are the same as those of the first embodiment.

The remainder of configuration, function and effects of the present embodiment are similar to those of the first embodiment.

Third Embodiment

Figure 28:
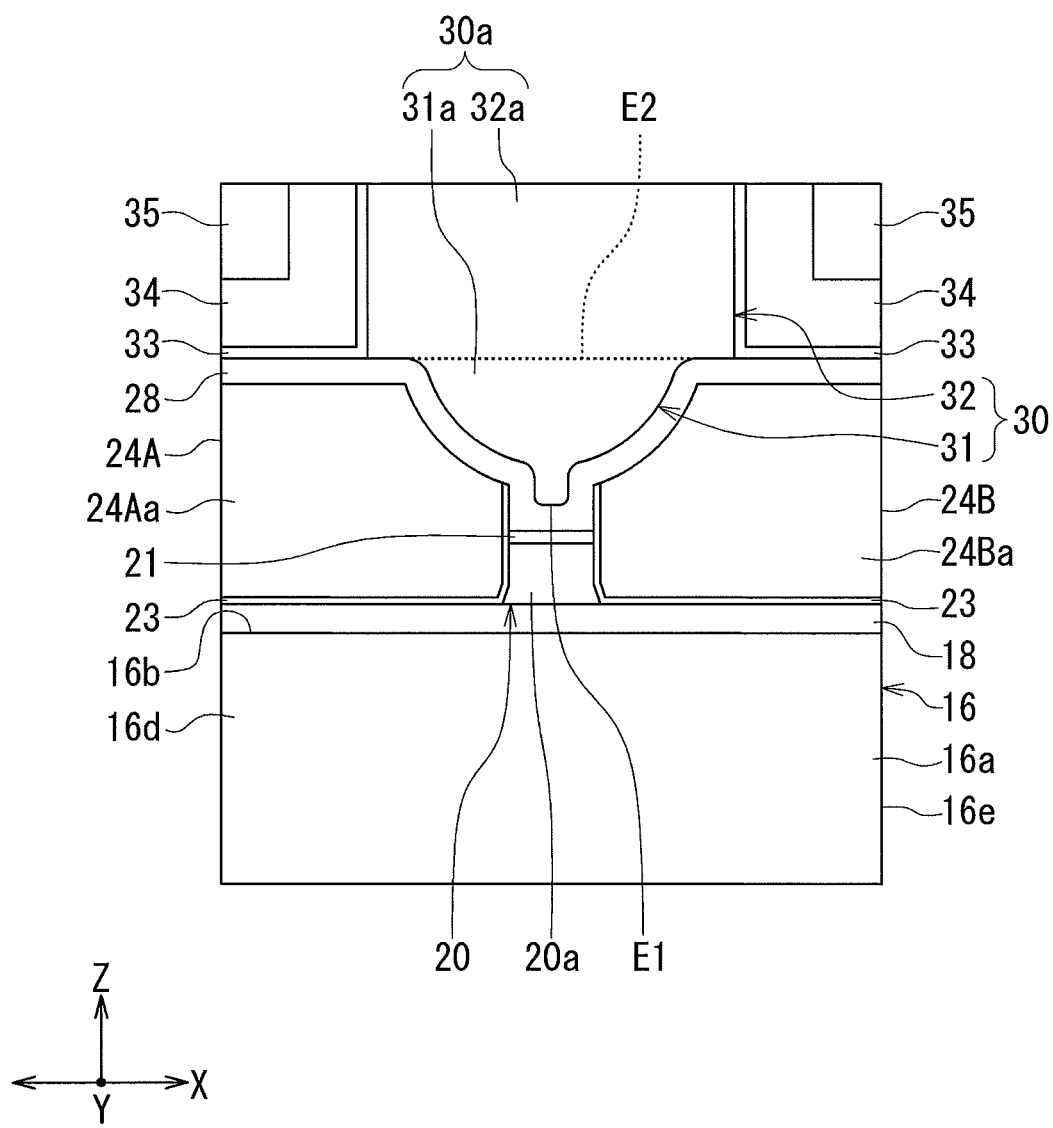
FIG. 28 is a front view showing the main part of a thermally-assisted magnetic recording head according to a third embodiment of the invention.

A thermally-assisted magnetic recording head according to a third embodiment of the invention will now be described with reference to FIG. 28. FIG. 28 is a front view showing the main part of the thermally-assisted magnetic recording head according to the present embodiment. In the present embodiment, the first end face portion 31a of the front end face 30a of the main pole 30 is shaped differently than in the first embodiment. More specifically, in the present embodiment, the first end face portion 31a has a lower part closest to the plasmon generator 20, and an upper part located between the lower part and the second end face portion 32a of the front end face 30a of the main pole 30. The width of the lower part in the track width direction (the X direction) is substantially constant regardless of distance from the near-field light generating surface 20a of the plasmon generator 20, and is smaller than the width of the near-field light generating surface 20a in the track width direction. The width of the upper part in the track width direction increases with increasing distance from the near-field light generating surface 20a of the plasmon generator 20. The maximum width of the upper part in the track width direction is greater than the width of the lower part in the track width direction and the width of the near-field light generating surface 20a in the track width direction.

The first end face portion 31a has a first edge E1 closest to the near-field light generating surface 20a, and a second edge E2 located at the boundary between the first end face portion 31a and the second end face portion 32a. The second edge E2 is longer than the first edge E1.

Like the second embodiment, given the first edge E1 of the same length, the first end face portion 31a has a larger area in the present embodiment than in the case where the width of the first end face portion 31a is constant regardless of distance from the near-field light generating surface 20a as in the first embodiment. Consequently, the present embodiment makes it possible for the main pole 30 to guide a larger amount of magnetic flux to the vicinity of the near-field light generating surface 20a.

A manufacturing method for the thermally-assisted magnetic recording head according to the present embodiment will now be described with reference to FIGS. 29 to 32. FIGS. 29 to 32 each show a stack of layers formed in the process of manufacturing the thermally-assisted magnetic recording head. FIGS. 29 to 32 omit the illustration of portions located below the core 16 and the cladding layer 17. FIGS. 29 to 32 each show a cross section corresponding to the medium facing surface 80 (see FIG. 5), that is, a cross section of the stack taken at the location at which the medium facing surface 80 is to be formed.

Figure 29:
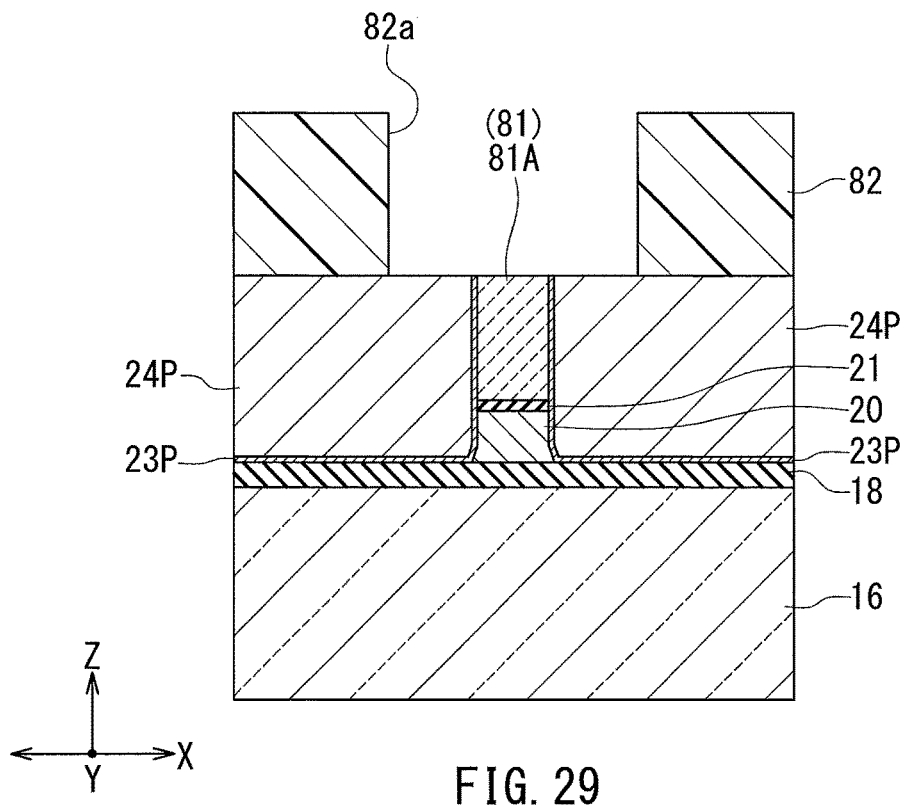
FIG. 29 is a cross-sectional view showing a step of a manufacturing method for the thermally-assisted magnetic recording head according to the third embodiment of the invention.

The manufacturing method for the thermally-assisted magnetic recording head according to the present embodiment is the same as the method according to the first embodiment up to the step shown in FIGS. 13A and 13B. According to the present embodiment, the first and second side shields 24A and 24B and the nonmagnetic film 23 are not yet completed at the point of the step shown in FIGS. 13A and 13B. The present embodiment performs the step of FIG. 11 and the subsequent steps without performing the step of FIG. 10, like the first modification example of the first embodiment FIG. 29 shows the next step. In this step, a photoresist mask 82 is formed over the magnetic layer 24P, the first heat sink 26 (see FIG. 13B) and the dielectric layer 27 (see FIG. 5). The photoresist mask 82 has an opening 82a shaped to correspond to the planar shape of the plasmon generator 20. The planar shape of the opening 82a is larger than the planar shape of the plasmon generator 20. As shown in FIG. 29, the opening 82a has a greater width in the track width direction than does the plasmon generator 20 in the cross section corresponding to the medium facing surface 80.

Figure 30:
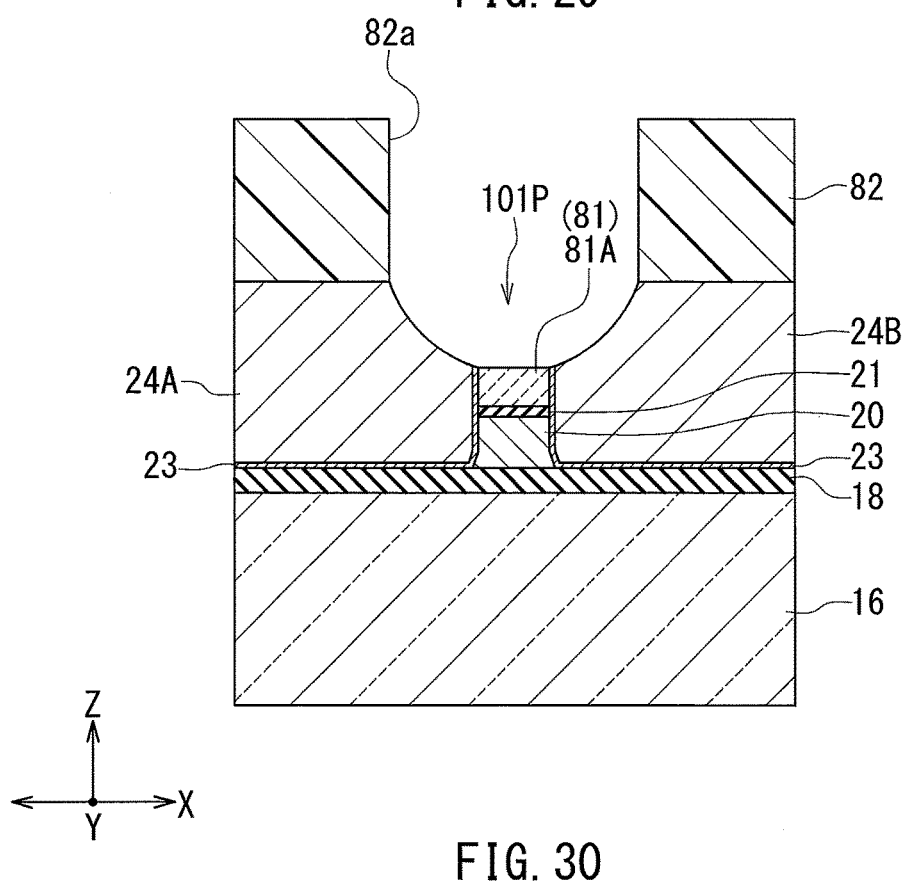
FIG. 30 is a cross-sectional view showing a step that follows the step shown in FIG. 29.

FIG. 30 shows the next step. In this step, part of each of the magnetic layer 24P, the initial nonmagnetic film 23P, the nonmagnetic metal film 25 and the first heat sink 26 and at least part of the etching mask 81 are etched by, for example, IBE using the photoresist mask 82 as an etching mask. This makes the magnetic layer 24P into the first and second side shields 24A and 24B, and makes the initial nonmagnetic film 23P into the nonmagnetic film 23. In the present embodiment, the etching mask 81 is etched in part so that a portion of the first mask layer 81A of the etching mask 81 remains on the plasmon generator 20 and the first insulating film 21. This makes it possible to prevent the top surface 20c (see FIGS. 2 and 3) of the plasmon generator 20 from being damaged by etching.

In FIG. 30, the reference symbol 101P denotes an initial recess formed by etching. As shown in FIG. 30, the width of the initial recess 101P in the track width direction (the X direction) decreases toward the plasmon generator 20 in the cross section corresponding to the medium facing surface 80.

Figure 31:
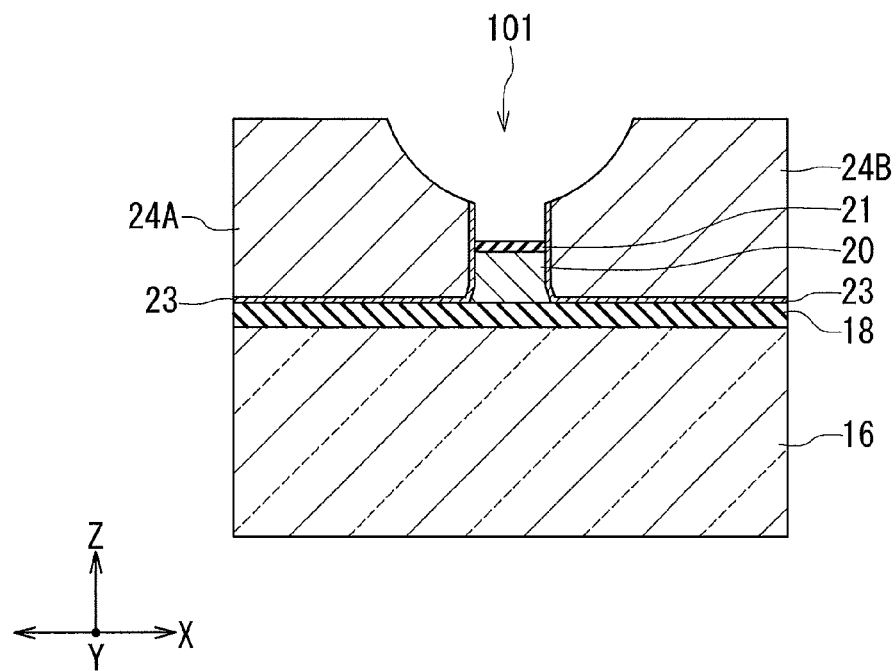
FIG. 31 is a cross-sectional view showing a step that follows the step shown in FIG. 30.

FIG. 31 shows the next step. In this step, the portion of the etching mask 81 (the portion of the first mask layer 81A) remaining after the step of FIG. 30 and the photoresist mask 82 are removed. This makes the initial recess 101P into the recess 101. According to the present embodiment, in the cross section corresponding to the medium facing surface 80, the width of the recess 101 in the track width direction (the X direction) gradually decreases toward the plasmon generator 20 and then becomes constant, as shown in FIG. 31.

Through the step of FIGS. 13A and 13B and a series of steps from the step of FIG. 29 to the step of FIG. 31, the magnetic layer 24P is processed into the first and second side shields 24A and 24B and at least part of the etching mask 81 is removed. These steps performed in series correspond to the processing step of the present invention. In the present embodiment, the processing step includes the step of polishing the magnetic layer 24P until the etching mask 81 is exposed, and the step of etching part of the magnetic layer 24P and at least part of the etching mask 81 after the step of polishing the magnetic layer 24P. The processing step results in the formation of a structure having the recess 101, the structure including the plasmon generator 20 and the first and second side shields 24A and 24B.

Figure 32:
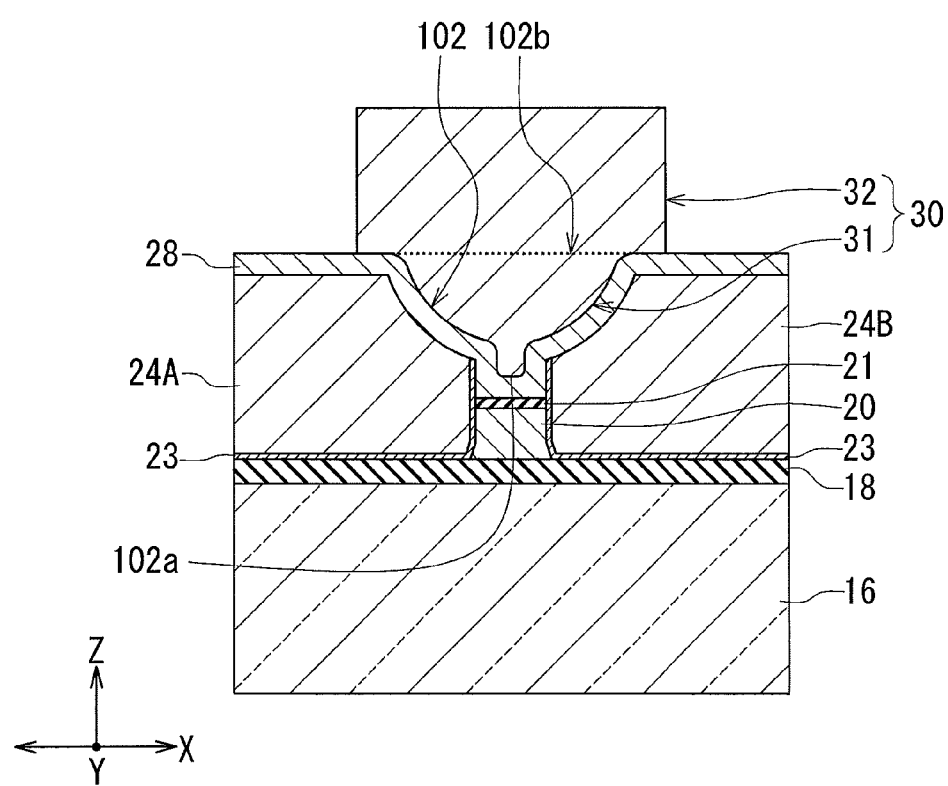
FIG. 32 is a cross-sectional view showing a step that follows the step shown in FIG. 31.

FIG. 32 shows the next step. In this step, first, the gap film 28 is formed on the aforementioned structure by atomic layer deposition, for example. The gap film 28 forms the receiving section 102 shaped to correspond to the recess 101. As has been described in relation to the second embodiment, the receiving section 102 has the bottom 102a and the opening 102b. In the present embodiment, the bottom 102a is smaller than the opening 102b in width in the track width direction (the X direction) in the cross section corresponding to the medium facing surface 80. Then, in the same manner as in the step of FIGS. 16A and 16B in the first embodiment, the main pole 30 is formed such that the first portion 31 is received in the receiving section 102. The subsequent steps are the same as those of the first embodiment.

The remainder of configuration, function and effects of the present embodiment are similar to those of the first or second embodiment.

Fourth Embodiment

Figure 33:
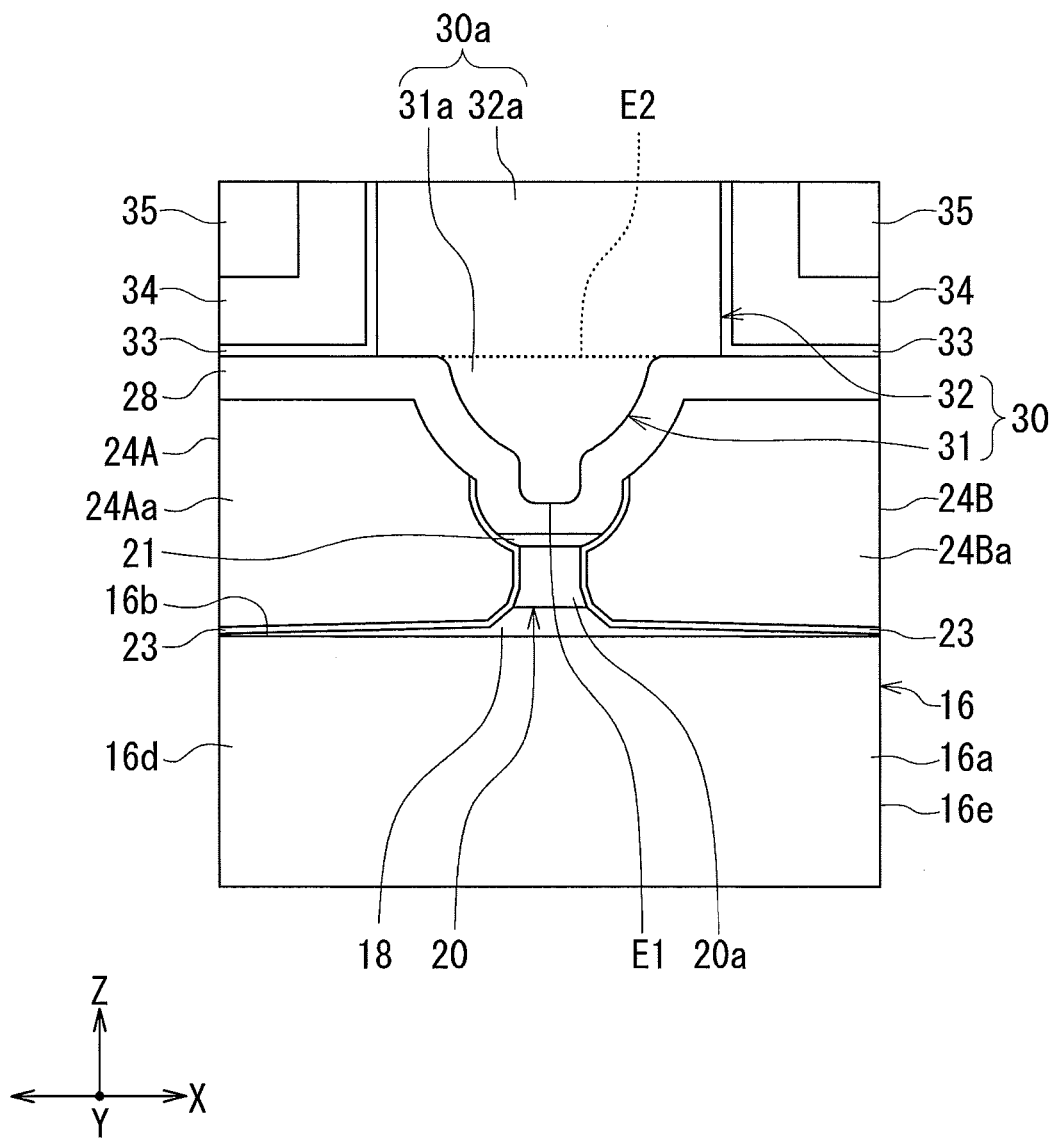
FIG. 33 is a front view showing the main part of a thermally-assisted magnetic recording head according to a fourth embodiment of the invention.

A thermally-assisted magnetic recording head according to a fourth embodiment of the invention will now be described with reference to FIG. 33. FIG. 33 is a front view showing the main part of the thermally-assisted magnetic recording head according to the present embodiment. In the present embodiment, the lower part of the first end face portion 31a of the front end face 30a of the main pole 30 is shaped differently than in the third embodiment. More specifically, in the present embodiment, the width of the lower part in the track width direction (the X direction) is almost equal to the width of the near-field light generating surface 20a of the plasmon generator 20 in the track width direction.

A manufacturing method for the thermally-assisted magnetic recording head according to the present embodiment will now be described with reference to FIGS. 34 to 37. FIGS. 34 to 37 each show a stack of layers formed in the process of manufacturing the thermally-assisted magnetic recording head. FIGS. 34 to 37 omit the illustration of portions located below the core 16 and the cladding layer 17.

FIGS. 34 to 37 each show a cross section corresponding to the medium facing surface 80 (see FIG. 5), that is, a cross section of the stack taken at the location at which the medium facing surface 80 is to be formed.

The manufacturing method for the thermally-assisted magnetic recording head according to the present embodiment is the same as the method according to the first embodiment up to the step shown in FIGS. 13A and 13B. According to the present embodiment, the first and second side shields 24A and 24B and the nonmagnetic film 23 are not yet completed at the point of the step shown in FIGS. 13A and 13B. The present embodiment performs the step of FIG. 11 and the subsequent steps with the second mask layer 81B of the etching mask 81 left unremoved. A difference in level between the top surface of the magnetic layer 24P and the top surface of the second mask layer 81B can develop due to a difference in polishing rate between the magnetic layer 24P and the second mask layer 81B.

Figure 34:
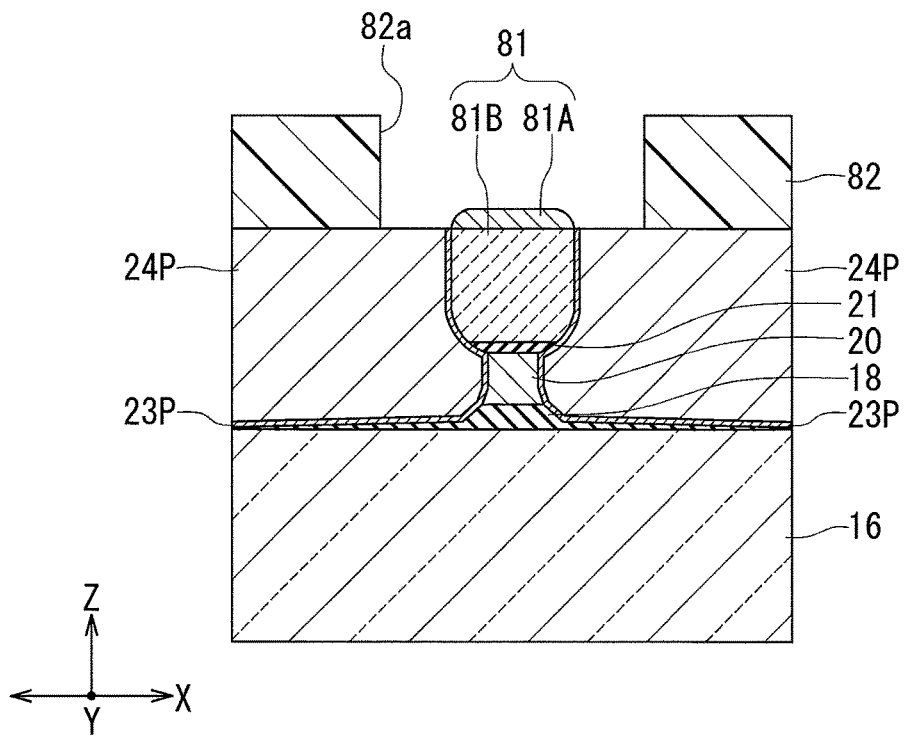
FIG. 34 is a cross-sectional view showing a step of a manufacturing method for the thermally-assisted magnetic recording head according to the fourth embodiment of the invention.

FIG. 34 shows the next step. In this step, the photoresist mask 82 is formed in the same manner as in the step of FIG. 29 in the third embodiment. FIG. 34 shows an example in which the portion of the cladding layer 18 not covered with the initial plasmon generator 20P is etched simultaneously with the etching of the initial plasmon generator 20P and the first insulating film 21 in the step of FIG. 10 in the first embodiment.

Figure 35:
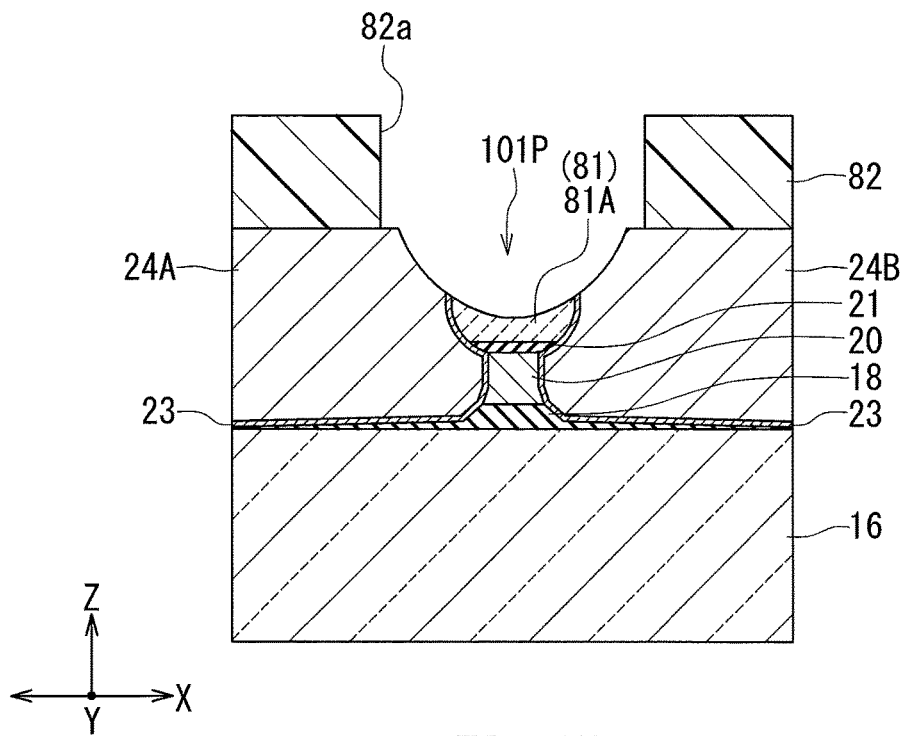
FIG. 35 is a cross-sectional view showing a step that follows the step shown in FIG. 34.

FIG. 35 shows the next step. In this step, part of each of the magnetic layer 24P, the initial nonmagnetic film 23P, the nonmagnetic metal film 25 and the first heat sink 26 and at least part of the etching mask 81 are etched by, for example, IBE using the photoresist mask 82 as an etching mask, as in the step of FIG. 30 in the third embodiment. This makes the magnetic layer 24P into the first and second side shields 24A and 24B, and makes the initial nonmagnetic film 23P into the nonmagnetic film 23. In the present embodiment, the etching mask 81 is etched in part so that the second mask layer 81B of the etching mask 81 is removed and a portion of the first mask layer 81A of the etching mask 81 remains on the first insulating film 21.

In FIG. 35, the reference symbol 101P denotes an initial recess formed by etching. The initial recess 101P has the same shape as that in the third embodiment. More specifically, as shown in FIG. 35, the width of the initial recess 101P in the track width direction (the X direction) decreases toward the plasmon generator 20 in the cross section corresponding to the medium facing surface 80.

Figure 36:
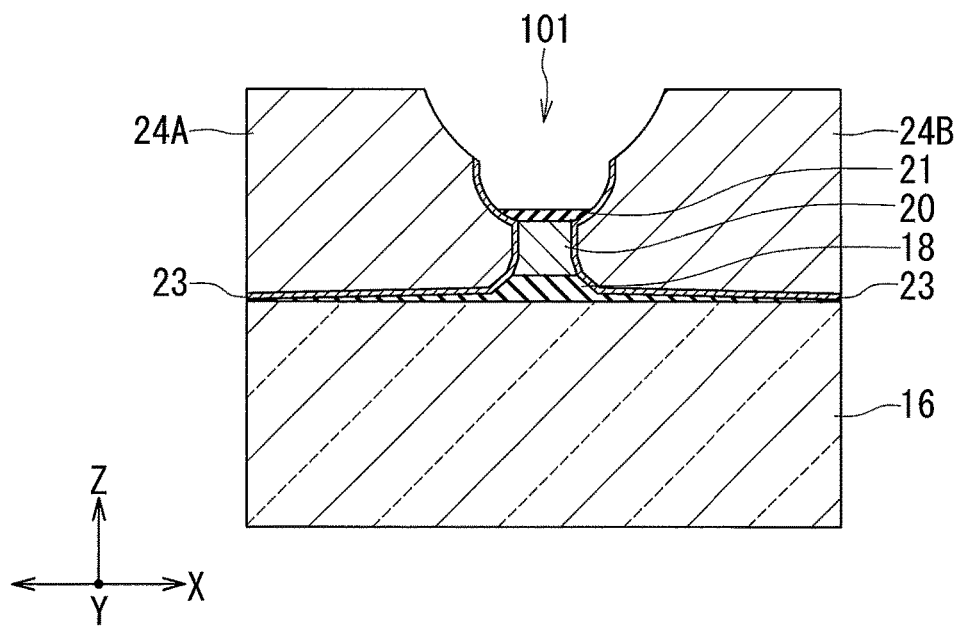
FIG. 36 is a cross-sectional view showing a step that follows the step shown in FIG. 35.

FIG. 36 shows the next step. In this step, as in the step of FIG. 31 in the third embodiment, the portion of the etching mask 81 (the portion of the first mask layer 81A) remaining after the step of FIG. 35 and the photoresist mask 82 are removed. This makes the initial recess 101P into the recess 101. The recess 101 has the same shape as that in the third embodiment. More specifically, as shown in FIG. 36, in the present embodiment the width of the recess 101 in the track width direction (the X direction) gradually decreases toward the plasmon generator 20 and then becomes constant in the cross section corresponding to the medium facing surface 80.

The step of FIGS. 13A and 13B and a series of steps from the step of FIG. 34 to the step of FIG. 36 correspond to the processing step of the present invention. The specifics of the processing step are the same as those in the third embodiment. The processing step results in the formation of a structure having the recess 101, the structure including the plasmon generator 20 and the first and second side shields 24A and 24B.

Figure 37:
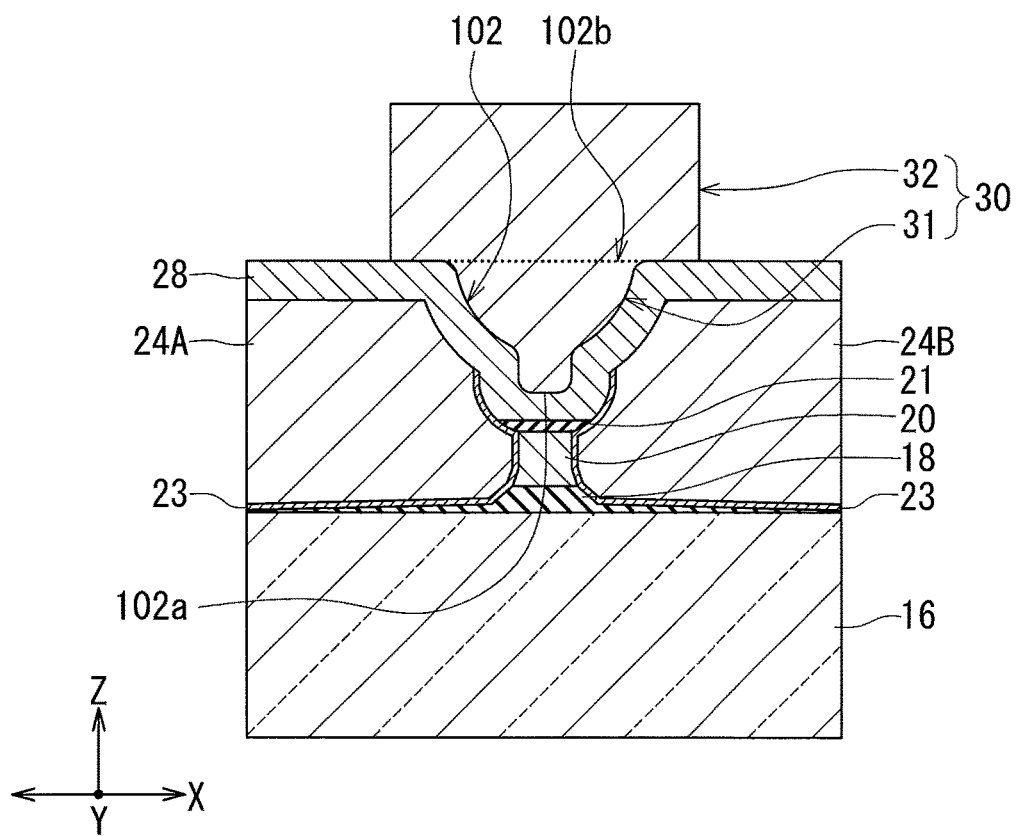
FIG. 37 is a cross-sectional view showing a step that follows the step shown in FIG. 36.

FIG. 37 shows the next step. In this step, first, the gap film 28 is formed on the aforementioned structure by atomic layer deposition, for example. The gap film 28 forms the receiving section 102 shaped to correspond to the recess 101. As has been described in relation to the third embodiment (the second embodiment), the receiving section 102 has the bottom 102a and the opening 102b. The bottom 102a is smaller than the opening 102b in width in the track width direction (the X direction) in the cross section corresponding to the medium facing surface 80. Then, in the same manner as in the step of FIGS. 16A and 16B in the first embodiment, the main pole 30 is formed such that the first portion 31 is received in the receiving section 102. The subsequent steps are the same as those of the first embodiment.

Modification Examples

Figure 38:
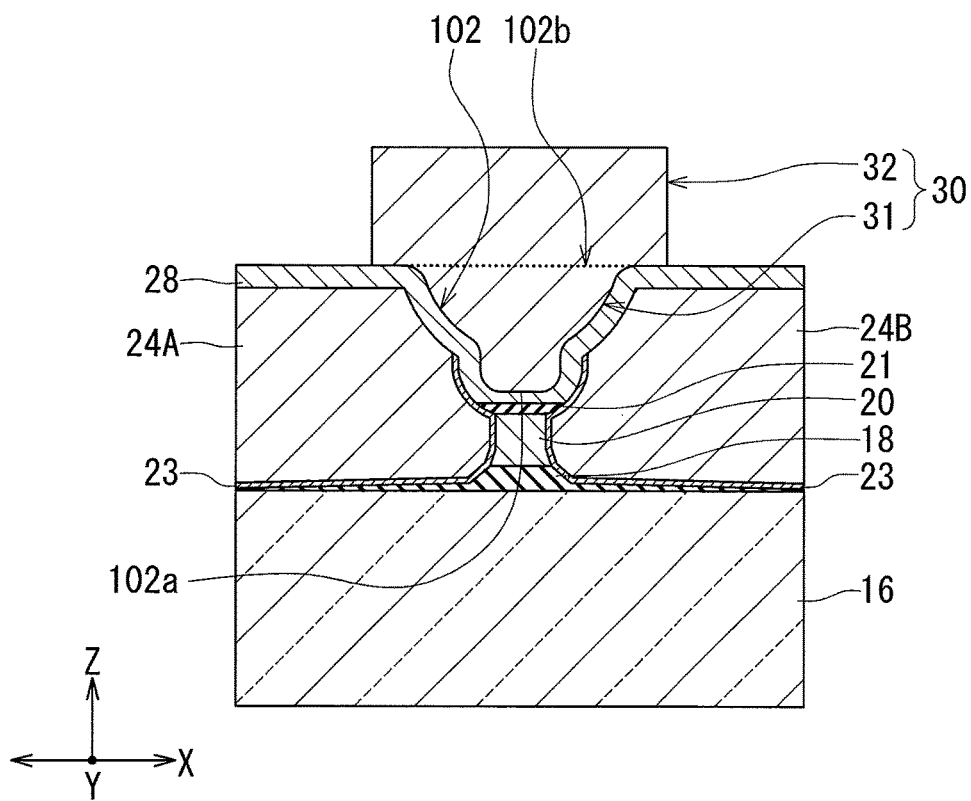
FIG. 38 is a cross-sectional view showing a step of a first modification example of the manufacturing method for the thermally-assisted magnetic recording head according to the fourth embodiment of the invention.
Figure 39:
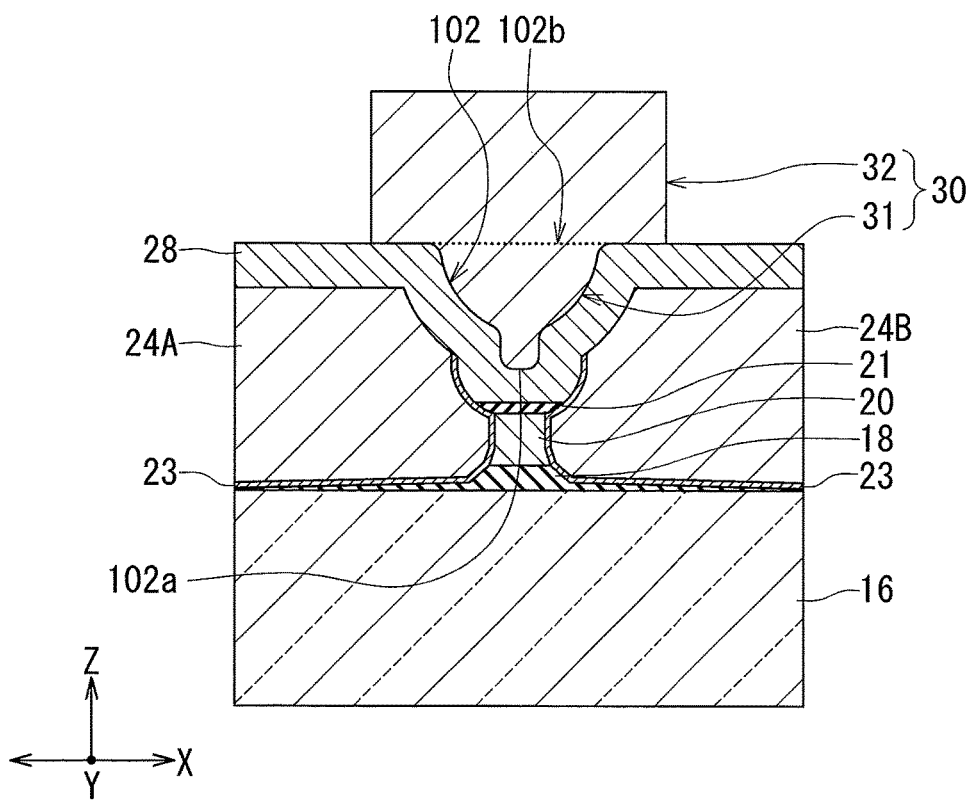
FIG. 39 is a cross-sectional view showing a step of a second modification example of the manufacturing method for the thermally-assisted magnetic recording head according to the fourth embodiment of the invention.

A first and a second modification example of the present embodiment will now be described with reference to FIGS. 38 and 39. FIGS. 38 and 39 each show a stack of layers formed in the process of manufacturing the thermally-assisted magnetic recording head. FIGS. 38 and 39 omit the illustration of portions located below the core 16 and the cladding layer 17. FIGS. 38 and 39 each show a cross section corresponding to the medium facing surface 80 (see FIG. 5), that is, a cross section of the stack taken at the location at which the medium facing surface 80 is to be formed.

The first modification example will be described first. In the first modification example, as shown in FIG. 38, the gap film 28 formed on the aforementioned structure has a smaller thickness than in the example shown in FIG. 36. In the cross section corresponding to the medium facing surface 80, the bottom 102a of the receiving section 102 is greater than the plasmon generator 20 in width in the track width direction (the X direction). Then, in the same manner as in the step of FIG. 37, the main pole 30 is formed such that the first portion 31 is received in the receiving section 102. Consequently, the lower part of the first end face portion 31a (see FIG. 33) of the front end face 30a of the main pole 30 has a greater width in the track width direction than the near-field light generating surface 20a (see FIG. 33) of the plasmon generator 20.

Next, the second modification example will be described. In the second modification example, as shown in FIG. 39, the gap film 28 formed on the aforementioned structure has a greater thickness than in the example shown in FIG. 36. In the cross section corresponding to the medium facing surface 80, the bottom 102a of the receiving section 102 is smaller than the plasmon generator 20 in width in the track width direction (the X direction). Then, in the same manner as in the step of FIG. 37, the main pole 30 is formed such that the first portion 31 is received in the receiving section 102. Consequently, the lower part of the first end face portion 31a (see FIG. 33) of the front end face 30a of the main pole 30 has a smaller width in the track width direction than the near-field light generating surface 20a (see FIG. 33) of the plasmon generator 20.

The remainder of configuration, function and effects of the present embodiment are similar to those of the first or third embodiment.

The present invention is not limited to the foregoing embodiments, and various modifications may be made thereto. For example, as far as the requirements of the appended claims are met, the main pole 30, the plasmon generator 20, the first side shield 24A, the second side shield 24B and the gap film 28 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
a medium facing surface configured to face a recording medium;
a coil for producing a magnetic field corresponding to data to be written on the recording medium;
a main pole having a front end face located in the medium facing surface;
a waveguide including a core and a cladding, the core allowing light to propagate therethrough, the cladding being provided around the core;
a plasmon generator having a near-field light generating surface located in the medium facing surface; and
a first side shield and a second side shield each formed of a magnetic material, wherein
the main pole is configured to pass a magnetic flux corresponding to the magnetic field produced by the coil, and to produce from the front end face a write magnetic field for use to write the data on the recording medium,
the plasmon generator is configured to excite a surface plasmon on the plasmon generator based on the light propagating through the core, and to generate near-field light from the near-field light generating surface based on the surface plasmon,
the front end face of the main pole includes a first end face portion, and a second end face portion contiguous with the first end face portion, the first end face portion and the second end face portion being located in the medium facing surface,
the second end face portion is greater than the first end face portion in width in a track width direction,
the near-field light generating surface, the first end face portion and the second end face portion are arranged in this order along a direction of travel of the recording medium,
the main pole includes a first portion and a second portion, the first portion including the first end face portion, the second portion including the second end face portion,
the first side shield has a first side shield end face located in the medium facing surface,
the second side shield has a second side shield end face located in the medium facing surface, and
the first side shield end face and the second side shield end face are located on opposite sides of at least part of the near-field light generating surface and at least part of the first end face portion in the track width direction such that the at least part of the near-field light generating surface and the at least part of the first end face portion are interposed between the first and second side shield end faces.

2. The thermally-assisted magnetic recording head according to claim 1, further comprising a gap film formed of a nonmagnetic material, wherein
the gap film is a single continuous film, and at least part of the gap film is interposed between the main pole and the plasmon generator, between the main pole and the first side shield, and between the main pole and the second side shield.

3. The thermally-assisted magnetic recording head according to claim 2, wherein the gap film is formed of one of nonmagnetic metal, SiC, and AlN.

4. The thermally-assisted magnetic recording head according to claim 1, wherein the first end face portion has a first edge closest to the near-field light generating surface, and a second edge located at a boundary between the first end face portion and the second end face portion, the second edge being longer than the first edge.

5. The thermally-assisted magnetic recording head according to claim 1, wherein
the core has an evanescent light generating surface for generating evanescent light based on the light propagating through the core,
the plasmon generator has a plasmon exciting section located at a predetermined distance from the evanescent light generating surface and facing the evanescent light generating surface, and
in the plasmon generator, the surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

6. The thermally-assisted magnetic recording head according to claim 1, wherein the front end face of the main pole is located on a front side in the direction of travel of the recording medium relative to the near-field light generating surface.

7. The thermally-assisted magnetic recording head according to claim 1, further comprising a return path section formed of a magnetic material, the return path section connecting the main pole to the first and second side shields and passing a magnetic flux corresponding to the magnetic field produced by the coil.

8. A manufacturing method for the thermally-assisted magnetic recording head of claim 1, comprising the steps of:
forming the waveguide;
forming the plasmon generator;
forming the first and second side shields after the plasmon generator is formed;
forming the main pole after the first and second side shields are formed; and
forming the coil.

9. The manufacturing method according to claim 8, wherein
the thermally-assisted magnetic recording head further comprises a gap film formed of a nonmagnetic material, the gap film being a single continuous film, at least part of the gap film being interposed between the main pole and the plasmon generator, between the main pole and the first side shield, and between the main pole and the second side shield,
the step of forming the plasmon generator includes the steps of:
forming an initial plasmon generator;
forming an etching mask for use to pattern the initial plasmon generator; and
etching the initial plasmon generator by using the etching mask so that the initial plasmon generator becomes the plasmon generator,
the step of forming the first and second side shields includes:

the step of forming a magnetic layer; and the processing step of processing the magnetic layer into the first and second side shields and removing at least part of the etching mask, the processing step results in the formation of a structure having a recess, the structure including the plasmon generator and the first and second side shields, the manufacturing method further comprises the step of forming the gap film on the structure after the processing step such that the gap film forms a receiving section corresponding to the recess, and the main pole is formed on the gap film such that the first portion is received in the receiving section after the step of forming the gap film.

10. The manufacturing method according to claim 9, wherein the receiving section has a bottom closest to the plasmon generator, and an opening farthest from the plasmon generator, and in a cross section corresponding to the medium facing surface, the bottom is smaller than the opening in width in the track width direction.

11. The manufacturing method according to claim 9, wherein, in the step of etching the initial plasmon generator, the initial plasmon generator is etched to make the plasmon generator smaller in width in the track width direction than the etching mask in a cross section corresponding to the medium facing surface.

12. The manufacturing method according to claim 9, wherein the processing step includes the step of polishing the magnetic layer until the etching mask is exposed, and the step of removing the etching mask after the step of polishing the magnetic layer.

13. The manufacturing method according to claim 9, wherein the processing step includes the step of polishing the magnetic layer until the etching mask is exposed, and the step of etching part of the magnetic layer and at least part of the etching mask after the step of polishing the magnetic layer.

* * * * *